US010810687B2

(12) United States Patent
Bidram et al.

(10) Patent No.: US 10,810,687 B2
(45) Date of Patent: Oct. 20, 2020

(54) SYSTEMS AND METHODS FOR AUTOMATED ARTICLE TRANSPORTATION AND MANAGEMENT THEREOF

(71) Applicant: Advanced Intelligent Systems Inc., Burnaby (CA)

(72) Inventors: Farhang Bidram, West Vancouver (CA); Hamed Ahmadi, Coquitlam (CA); Afshin Doustmohammadi, North Vancouver (CA)

(73) Assignee: Advanced Intelligent Systems Inc., Burnaby (CA)

( * ) Notice: Subject to any disclaimer, the term of this patent is extended or adjusted under 35 U.S.C. 154(b) by 21 days.

(21) Appl. No.: 16/506,382

(22) Filed: Jul. 9, 2019

(65) Prior Publication Data

US 2020/0118222 A1   Apr. 16, 2020

Related U.S. Application Data

(60) Provisional application No. 62/743,641, filed on Oct. 10, 2018.

(51) Int. Cl.
*G06Q 50/02* (2012.01)
*G05B 13/02* (2006.01)
(Continued)

(52) U.S. Cl.
CPC .......... *G06Q 50/02* (2013.01); *B65G 1/1375* (2013.01); *G05B 13/0265* (2013.01);
(Continued)

(58) Field of Classification Search
CPC ............ G06Q 50/02; G06Q 10/06316; G06Q 10/06393; G06Q 30/04; G05B 13/0265;
(Continued)

(56) References Cited

U.S. PATENT DOCUMENTS 8,532,820 B1   9/2013 Sampath
8,676,425 B2   3/2014 Jones et al.
(Continued)

FOREIGN PATENT DOCUMENTS

CN   202795029 U   3/2013
DE   102016014634 A1   6/2018
(Continued)

OTHER PUBLICATIONS

CIPO as International Searching Authority, International Search Report and Written Opinion for PCT/CA2019/051438, dated Jan. 14, 2020.

*Primary Examiner* — Robert E Fennema
*Assistant Examiner* — Christopher W Carter
(74) *Attorney, Agent, or Firm* — Own Innovation; James W. Hinton

(57) ABSTRACT

A system for managing and tracking plant management at a site is provided. The system includes a device management server and a plant management device communicatively connected to the device management server via a network. The plant management device is configured to: receive a plant management task order including task instructions for performing a plant management task and automatically perform the plant management task according to the task instructions; send a task receipt notification to the device management server, the task receipt notification including task beneficiary data; and transmit task performance data to the device management server, the task performance data logged during performance of the plant management task. The device management server is configured to: generate a work report for the plant management device from the task performance data; generate a billing report for the plant management device from the task beneficiary data and billing rate data, the billing report including a billable
(Continued)

amount; and generate a productivity profile for the plant management device.

13 Claims, 19 Drawing Sheets

(51) Int. Cl.
  *G05B 19/418*  (2006.01)
  *G06Q 10/06*   (2012.01)
  *B65G 1/137*   (2006.01)
  *G06Q 30/04*   (2012.01)

(52) U.S. Cl.
  CPC . *G05B 19/41865* (2013.01); *G06Q 10/06316* (2013.01); *G06Q 10/06393* (2013.01); *G06Q 30/04* (2013.01); *G05B 2219/32423* (2013.01)

(58) Field of Classification Search
  CPC .... G05B 19/41865; G05B 2219/32423; B65G 1/1375
  USPC ......................................................... 700/100
  See application file for complete search history.

(56) References Cited

U.S. PATENT DOCUMENTS

| | | |
|---|---|---|
| 8,915,692 B2 | 12/2014 | Grinnell et al. |
| 8,930,022 B1 | 1/2015 | Kuffner, Jr. et al. |
| 8,937,410 B2 | 1/2015 | Comins et al. |
| 9,031,692 B2 | 5/2015 | Zhu |
| 9,147,173 B2 | 9/2015 | Jones et al. |
| 9,438,648 B2 | 9/2016 | Asenjo et al. |
| 9,568,917 B2 | 2/2017 | Jones et al. |
| 9,927,814 B2 | 3/2018 | Wise et al. |
| 9,956,688 B2 | 5/2018 | Ferguson et al. |
| 10,011,013 B2 | 7/2018 | Bingham et al. |
| 10,114,372 B1 | 10/2018 | Theobald |
| 2008/0120129 A1 | 5/2008 | Seubert et al. |
| 2008/0174268 A1* | 7/2008 | Koo .................... A47L 9/2805 320/109 |
| 2009/0005990 A1* | 1/2009 | Anderson .............. G06Q 10/00 702/2 |
| 2011/0270724 A1 | 11/2011 | O'Neil et al. |
| 2016/0288328 A1 | 10/2016 | Bingham et al. |

FOREIGN PATENT DOCUMENTS

| | | | |
|---|---|---|---|
| EP | 0595431 A1 | 5/1994 | |
| EP | 1183942 A1 | 3/2002 | |
| WO | 2013066254 | 5/2013 | |
| WO | WO-2014025925 A1 * | 2/2014 | ............. G08G 1/205 |
| WO | 2015188177 A2 | 12/2015 | |
| WO | 2016165721 A1 | 10/2016 | |
| WO | 2018136008 A1 | 7/2018 | |
| WO | 2018187308 A1 | 10/2018 | |

\* cited by examiner

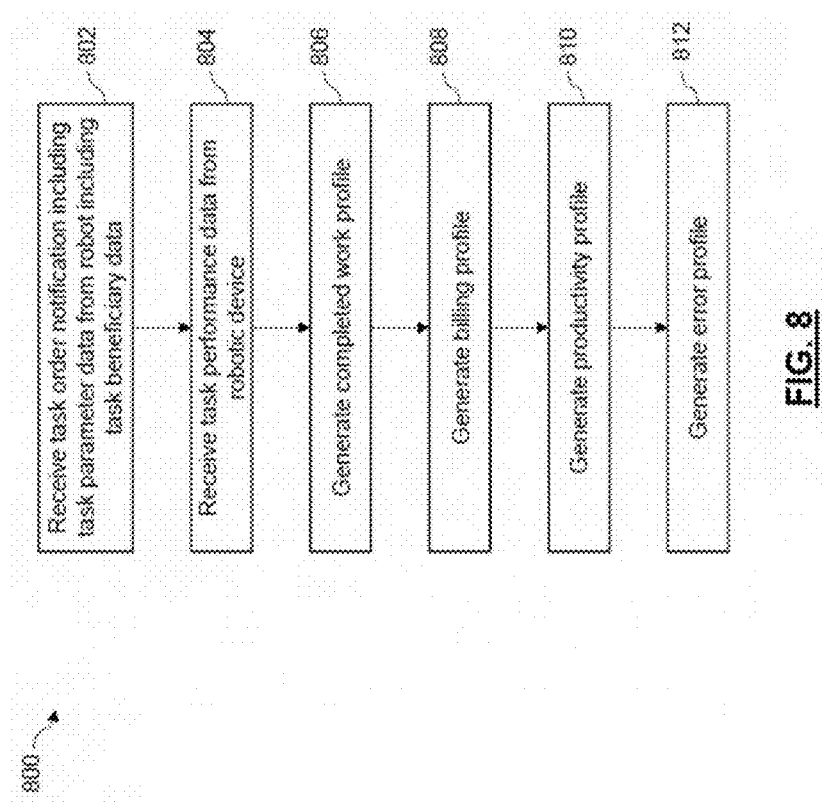

SYSTEMS AND METHODS FOR AUTOMATED ARTICLE TRANSPORTATION AND MANAGEMENT THEREOF

TECHNICAL FIELD

The following relates generally to article transportation, and more particularly to systems and methods for autonomous transportation of articles and management thereof.

INTRODUCTION

Generally, in a storage facility, warehouse, greenhouse nursery, airport, and the like, physical articles must be transported around the site, for example from location to location multiple times, sometimes over significant distances. In a greenhouse nursery example, potted plants are transported around the nursery, for example from potting station to a growing fields (bay), from one point to another within a growing field, from one growing field back to potting station, and from a growing field to a shipping station for shipment.

Currently, in most greenhouse nurseries potted plants are transported largely using labor. Labor is usually seasonal and has limited availability, is costly, and is prone to health and safety risks and associated costs.

In recent years, robotic and automated systems have been proposed to reduce labor, improve efficiency and productivity, and reduce costs.

Existing approaches to automating a greenhouse nursery for article transport include constructing a complex infrastructure of stationary and sometimes, especially in more modern cases, mobile rails and conveyor lines such as conveyor belts. These systems may require substantial infrastructure and redesign of an existing greenhouse. The systems and their components may require large amounts of capital for constructing the system. Patent Applications EP1183942A1, EP0595431A1, WO02013066254A1, and WO2015188177A2 present examples of such complicated systems.

According to current techniques, transportation of articles, such as container-based plants, from location to location in their storage or holding environment can require significant changes or modification to the existing storage environment. Such techniques may utilize basic labor, transportation, and maintenance, and rely heavily on human workers, leading to increased cost and time to complete inefficient operations.

Using or otherwise incorporating an automated approach to addressing these issues can include associated overhead and operations cost. Billing for work performed may be complicated and difficult to manage. Purchasing automation equipment can be expensive and, in some cases, prohibitive.

Robotic vehicles may be configured to carry out a certain task autonomously or semi-autonomously for a variety of applications including product transportation and material handling. Autonomous mobile robotic vehicles can typically navigate and detect objects automatically and may be used alongside human workers, thereby potentially reducing the cost and time required to complete otherwise inefficient operations such as basic labor, transportation, and maintenance.

Accordingly, there is a need for an improved system and method for article transportation in storage facilities such as plant nurseries that overcomes at least some of the disadvantages of existing systems and methods.

SUMMARY

A system for managing and tracking plant management at a site is provided herein. The system includes a device management server and a plant management device communicatively connected to the device management server via a network. The plant management device is configured to: receive a plant management task order including task instructions for performing a plant management task and automatically perform the plant management task according to the task instructions; send a task receipt notification to the device management server, the task receipt notification including task beneficiary data; and transmit task performance data to the device management server, the task performance data logged during performance of the plant management task. The device management server is configured to: generate a work report for the plant management device from the task performance data; generate a billing report for the plant management device from the task beneficiary data and billing rate data, the billing report including a billable amount; and generate a productivity profile for the plant management device.

The task instructions may include instructions for at least one of transporting a plant between a potting station and a growing field, transporting the plant from a first location to a second location within the growing field, transporting the plant from the growing field to a shipping station.

The device management server may be further configured to generate a plant management task optimization from the productivity profile.

The device management server may be further configured to provide productivity profile data as an input to a machine learning algorithm, and the machine learning algorithm configured to generate the plant transportation optimization as an output.

The task performance data may include environmental data about the site, and the device management server may be further configured to determine whether the environmental data deviates from an accepted standard.

The environmental data may include at least one of air humidity, ambient light, direct light, temperature, and atmospheric composition.

The environmental data may include location data for each measurement.

The device management server may be further configured to determine an operational life expectancy for the plant management device, wherein the operational life expectancy includes an estimated number of performance cycles before failure.

The device management server may be further configured to determine the operational life expectancy from a machine health signature.

The task performance data may include transported plant data, and the device management server may be further configured to determine a plant health condition from the transported plant data.

A method of tracking and analyzing usage is also provided herein. The method includes storing task parameter data, task performance data, and billing rate data. The task parameter data and task performance data correspond to a task. The task performance data is generated during performance of the task. The method also includes generating a completed work profile from the task parameter data and the task performance data. The method also includes generating a billing profile from the task parameter data, task performance data, and billing rate data, wherein the billing profile includes a billing amount representing a cost for performing the task. The method also includes generating a productivity profile from the task parameter data and task performance data, wherein the productivity profile represents a productivity level. The method also includes generating an error profile from the task parameter data and the task performance data.

The task may include transporting a target article from a first location to a second location at a site.

The method may further include determining an article transportation optimization from the productivity profile, wherein the article transportation optimization includes a suggested modification to how the task is performed.

Determining the article transportation optimization may include inputting the productivity profile to a machine learning algorithm and generating the article transportation optimization using the machine learning algorithm.

A usage tracking and management system is also described herein. The system includes a device management server communicatively connected to a task requestor device, a device supplier device, and a task performing device via a network. The task performing device is configured to perform a task according to received task instructions. The device management server is configured to receive task performance data, the task performance logged during performance of the task; generate a device usage profile from a first subset of the task performance data; generate a device performance profile from a second subset of the task performance data; transmit the device usage profile to the task requestor device; transmit the device performance profile to at least one of the task performing device, the task requestor device, and the device supplier device.

The device usage report may include a billable amount. The device management server may generate the billable amount from the task performance data and billing rate data.

The device performance profile may include a productivity level, the productivity level determined from the task performance data and task duration data.

Generating the device performance profile may include generating a task performance optimization, wherein the task performance optimization includes a suggested modification to how the task is performed.

The task performance optimization may include a navigation route optimization.

Generating the task performance optimization may include providing productivity data as an input to a machine learning algorithm, the machine learning algorithm configured to generate the task performance optimization as an output.

The device performance profile may include machine health data describing a machine state. The machine health data may be generated from a machine health signature.

The task performance data may include error data including errors made during performance of the task. The device performance profile may include an error profile derived from error data.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 8 is a flowchart of a method of tracking and analyzing usage of a robotic device, according to an embodiment;

DETAILED DESCRIPTION

Figure 1A:
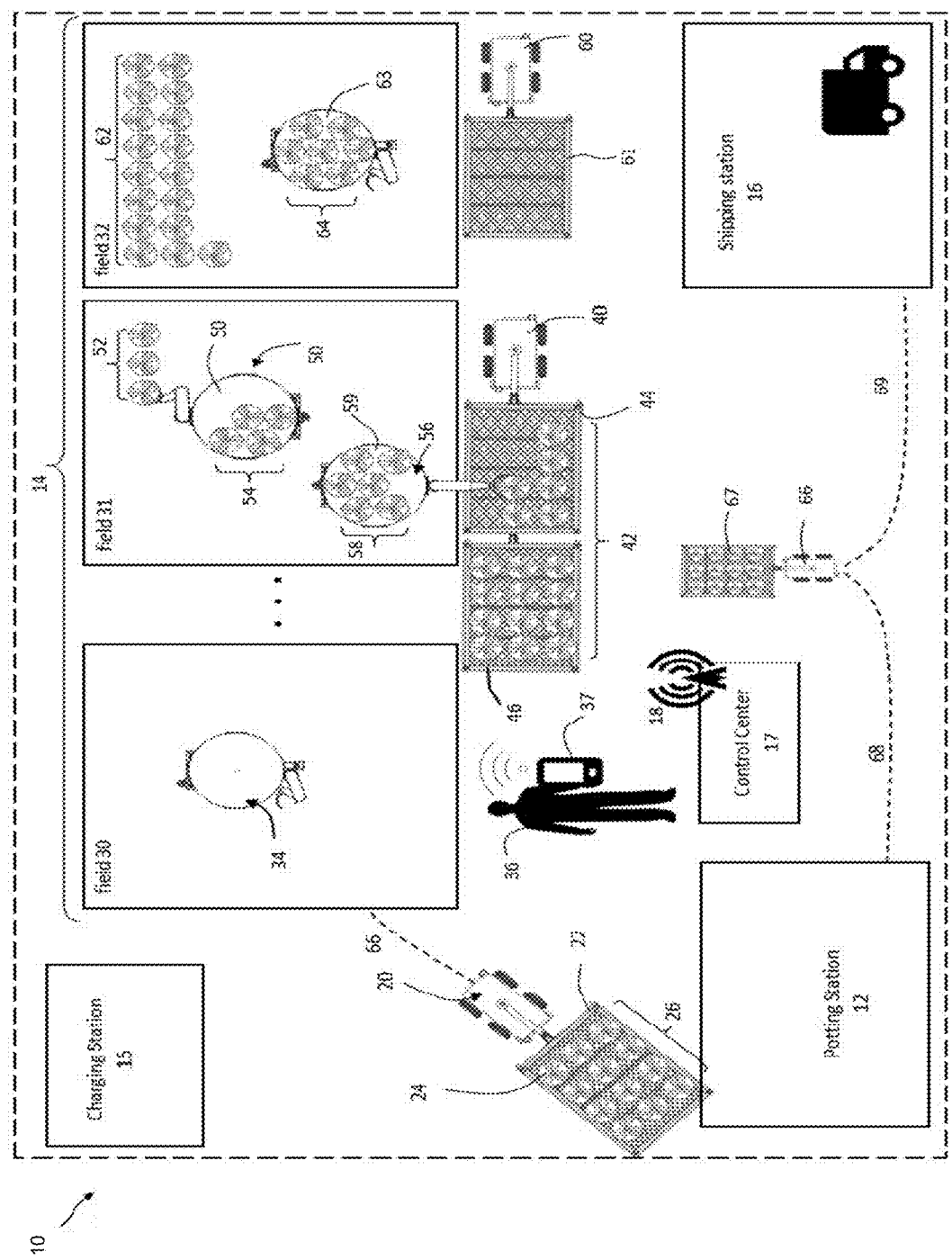
FIG. 1A is a plan view of a plant nursery environment and a system of the present disclosure implemented therein, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to article transportation, and more particularly to autonomous transportation of articles and management thereof. In a particular embodiment, the following provides systems and methods for transportation of potted plants in greenhouse nurseries and management thereof.

In accordance with one aspect of the present disclosure, there is provided a system and method herein for autonomous article transportation, particularly, plant pot transportation in the environment of a plant nursery. The method includes loading at least one cart with plant pots in a potting station and then using an autonomous cart pulling mobile robot to transport the at least one cart from the potting station to a pickup location at a target pot field. The cart pulling robot includes a wheeled chassis, a manipulator and gripper assembly disposed on the wheeled chassis and configured to grasp a cart, at least one navigation sensor such as a GPS or LiDAR disposed on the wheeled chassis to assist the robot in autonomous navigation, a controller unit to control the autonomous processes of the robot, and a power supply unit such as a battery to supply power to electronic components of the robot. The cart pulling robot may be configured to pull one cart or a series of connected carts. The carts may be configured to have a single shelf or multiple shelves to house plant pots for transportation.

The method further includes unloading each plant pot from a cart at the pickup location of a pot field and transporting the unloaded plant pot to a drop-off location in the pot field using a pot transporting mobile robot. The pot transporting robot includes a wheeled chassis, an article platform disposed on the wheeled chassis for storing pots, at least one manipulator and gripper assembly disposed on the wheeled chassis for pot manipulation, at least one navigation sensor such as a GPS or LiDAR disposed on the wheeled chassis to assist the robot in autonomous navigation, a controller unit to control the autonomous processes of the robot, and a power supply unit such as a battery to supply power to electronic components of the robot.

The pot transporting robot may be configured to perform a pot deposition process within a field area. The pot deposition process may include: (1) unloading a plurality of pots from a cart to the article platform of the robot using the robot's manipulator; (2) driving the wheeled chassis to navigate toward the drop-off location in the field; (3) unloading the plurality of pots from the article platform to the drop-off location using the robot's manipulator; (4) driving the wheeled chassis back to the cart at the pickup location; and (5) repeating steps (1) to (4) until all of the pots on the cart are deposited within the field or the field is filled with pots.

The method may further include transporting at least one empty cart to a collection location at a target field by using the cart pulling robot, filling the at least one empty cart with pots in the target field using the pot transporting robot, and transporting the at least one filled cart to either: the potting station for further process on the pots in the potting station (processes such as repotting), or a shipping center to prepare the pots for shipment outside of the plant nursery.

The pot transporting robot may be further configured to perform a pot collection process. The pot collection process may be performed within a field area. The process may include (1) loading a plurality of pots from the field to the article platform of the robot using the robot's manipulator; (2) driving the wheeled chassis to navigate toward the collection location in the field; (3) unloading the plurality of pots from the article platform to the cart using the robot's manipulator; (4) driving the wheeled chassis back to the loading area at the field; and (5) repeating steps (1) to (4) until all of the pots in the field area are collected.

In case the cart includes multiple shelves, the cart can be equipped with a height adjustment mechanism to adjust the height of the shelves. The pot transporting robot may be configured to first unload the pots from a first, lower shelf of the cart, then lower a second shelf using the height adjusting mechanism and unload the pots in the second shelf, and then repeat the same process for the pots in the next shelves of the cart.

The method may further include facilitating, via a control center, coordination and collaboration among robots and between the robots and an operator unit inside the control center. The operator may be a human operator or a computer algorithm.

The method may further include a charging station located inside the working environment (i.e. plant nursery) and configured to recharge the batteries or power units of each robot. Each robot is configured to pause its task and navigate toward the charging station for recharging once its power level is low and below a certain threshold. Each robot is configured to resume its task once its power level is full. The battery charging in the charging station may be carried out manually by having a person to manually change the low-charge battery of a robot by a fully charged battery, or automatically by having a robot to plug-in to a charger and stay plugged-in until the robot's battery is full.

The pot transporting robot may additionally comprise processing modules on-board the robot to perform a processing on a pot during transportation. Examples of the processes include trimming a plant, inspecting a plant by imaging and vision sensors, irrigating and fertilizing a plant. The robot may include a module corresponding to each of these processes. As an example, the robot may include a trimming module that is attached to a pot transporting robot for performing a trimming process on the plants during transportation.

The pot transporting robot may load and unload pots to and from a cart autonomously. This may be realized in multiple ways, for example, the cart may have a mechanism to cause shelves to collapse or the pot transporting robot may have a variable elevation which enables the robot to access different shelves of a cart for loading and unloading. For example, the cart may be a collapsible multi shelf cart.

Systems and methods of the present disclosure may facilitate or enable transportation of container-based plants in a greenhouse while requiring minimal or zero change to the existing site (i.e. greenhouse nurseries) by using autonomous mobile robots.

The robotic device may be an autonomous mobile robotic vehicle. Autonomous mobile robotic vehicles typically can navigate and detect objects automatically and may be used alongside human workers, thereby potentially reducing the cost and time required to complete otherwise inefficient operations such as basic labor, transportation and maintenance.

In order to further reduce the overhead and operations cost, the current disclosure provides a robotic device management system that manages and simplifies the billing information by using a cloud-based server in communication with the robots and machines that perform the jobs. Using the system, the site operator (e.g. nursery) does not need to purchase the robots but instead can "recruit" the robotic devices and machines and pay only for the job that the robotic devices and machines do. Such a system may allow the user to forgo expensive capital expenditures and the like associated with purchasing or otherwise accessing robotic devices, while still being able to access and use more modern technology options and not having to continue with less efficient operations. The cloud server aggregates data, such as the number of transported plants and the transported distance, the number of plants processed by plant processing devices (e.g. pruners, potting stations), time elapsed during a task, amount of power consumed during performance of a task (e.g. battery drain), or a total area of the work space for which work was completed. The cloud server can create infographics and bills based on the aggregated data. The data may be measured, recorded, and sent to the cloud server using sensors (e.g. individual sensors) on the task-performing device (e.g. robotic device) such as odometers, switches or timers, or may be derived through aggregation of sensor data (e.g. optical camera data), and analyzed to determine a task process's completion, for example. In the latter case, for example, row or lightly analyzed camera data regarding footage, image data, or video data taken of a plant can be sent to the cloud server and then analyzed in the cloud to determine a plant type (i.e. what type of plant it is), a growth percentage of the plant (e.g. using historical data over time), and a health status of the plant.

The cloud server additionally may be configured to aggregate data related to the environment of the nursery (such as temperature and humidity). Environmental data may be analyzed, for example using machine learning algorithms, to determine a site environment condition and, in some cases, determine whether the environment condition deviates from an accepted standard. Analysis of environmental data by the device management server may provide valuable information and insights regarding operation of the site (e.g. nursery).

The cloud server may also be configured to aggregate data related to the plants. Transported plant data may be used to determine a plant health condition. Transported plant data is collected by the robotic device during performance of the task using sensors (e.g. imaging and vision sensors) and other components (task performance data subsystem). Transported plant data may include soil humidity, appearance (e.g. plant leaf appearance, etc. Transported plant data may include image data of the plant acquired by the robotic device. Transported plant data is transmitted from the robotic device to the device management server. In some cases, the device management server may analyze transported plant data using a machine learning algorithm to determine the plant health condition. (such as soil humidity and a plant's leaves appearances from a picture taken from the plant by a robot) and then analyze them in small and big scales (big data), for example using machine learning algorithms, to derive valuable information and insights regarding the operation of the nurseries.

In an embodiment, the present disclosure describes a system using mobile robots instead of rails and conveyor lines to transport articles around a greenhouse. The system includes mobile robots configured to transport plants through a chain-of-plant transportation within a greenhouse and is advantageously not limited to transportation of such plants in a potting field. The system includes a cloud server facilitates autonomous transportation of pots from a potting station then to a nursery field, then distribution within a field, and then back to the potting station or delivery to a shipping center for shipment out of the facility.

The pot transporting robot may be configured to have a storage for carrying a bulk of pots (for example more than 30 pots), and a manipulator mechanism to drop-off the pots in bulk or individually. The robot could load the batch of pots from the potting station directly, move to a field and then drop off the pots inside the field.

In some embodiments, instead of having a cart-puller vehicle, a cart carrying vehicle could be used (a vehicle that goes under each cart and carries it)

Referring now to FIG. 1, a system for autonomous pot transportation in a plant nursery environment is generally shown at 10 according to one disclosed embodiment of the disclosure. The boundaries of system 10 are shown by dashed borders. The system 10 includes a potting station 12 at which plants are processed and planted in pots. At potting station 12, a plant pot 24 from a plurality of plant pots 26 is loaded into a cart 22. Hereafter, plant pot may be referred to as pot and each pot 24 may be of different sizes and geometries. The cart 22 may be a multi-shelf cart or a single-shelf cart. An autonomous cart pulling robotic apparatus 20 is configured to engage and grasp the cart 22 at potting station 12 once the cart 22 is filled with the plurality of pots 26.

Figure 2A:
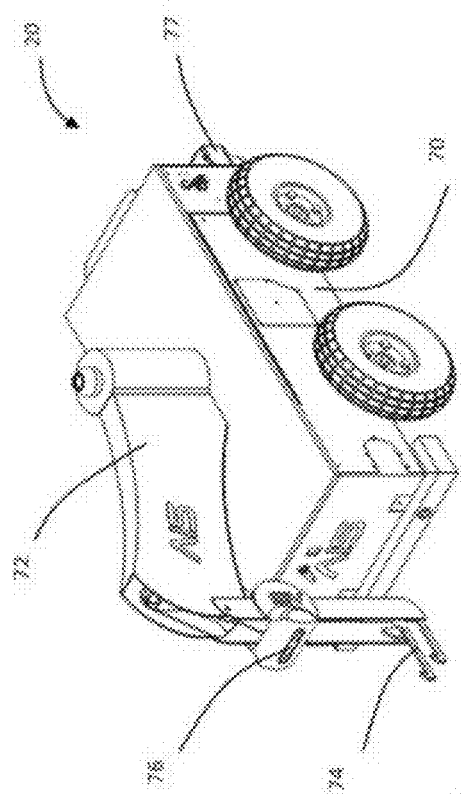
FIG. 2A is a perspective view of a cart pulling robot, according to an embodiment.
Figure 2C:
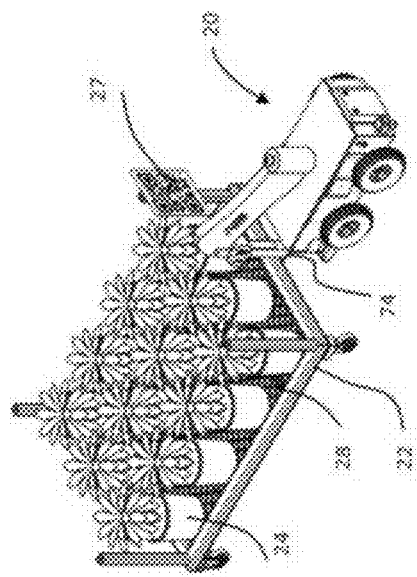
FIG. 2C is a perspective view of a cart pulling robot, according to an embodiment.
Figure 2B:
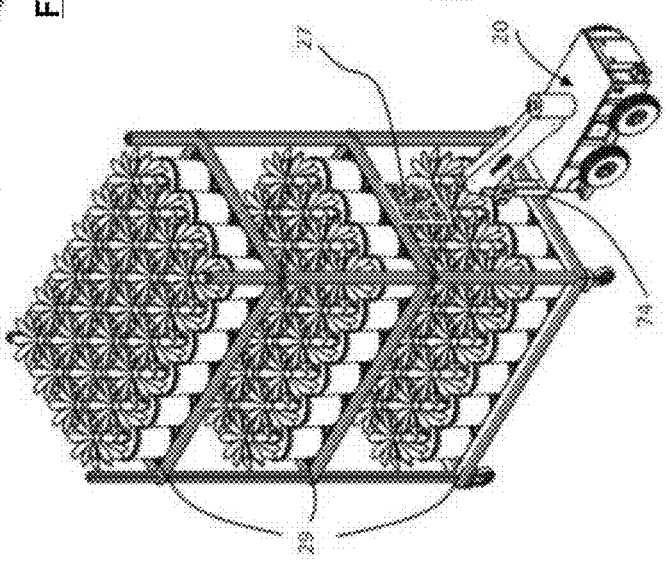
FIG. 2B is a perspective view of a cart pulling robot, according to an embodiment.

Referring now to FIG. 2A to 2C, an embodiment of the cart pulling robot is presented generally at 20. As shown in FIG. 2A, the robot 20 includes a wheeled chassis 70 and at least one robotic manipulator assembly 72 disposed on the wheeled chassis. A gripper end effector 74 is attached to the manipulator 72 and is configured to effectively grasp a cause a cart to temporarily attach to the robot 20 especially while the robot 20 is set to pull the cart. The gripper end effector 74 may be a mechanical or pneumatic hook or a multi-finger gripper. The manipulator 72 may further include a vision sensor such as an optical camera to assist the robot 20 in grasping a cart. The robot 20 further include at least one sensor such as LiDAR, Radar, or vision camera (or other guidance system) to assist the robot 20 in navigation through the environment. The apparatus 20 also includes, inside the wheeled chassis 70, a power supply unit to provide power for different electronics in the robot, a controller unit such as a portable computer to control all the processes of the robot, a navigation sensor such as a GPS or ultra-wideband sensor to assist the robot in navigation through an environment, and a WiFi module to transmit signals and data to and from the robot 20 (the power supply, the controller unit, the navigation sensors, and the Wi-Fi module are not shown in FIG. 2A, 2B, or 2C).

Referring now to FIGS. 2B and 2C, the cart pulling robot 20 is configured to engage with a cart 22 using the end effector 74. The cart 22 may include one shelf 28 or multiple shelves 29 to store multiple plant pots 24. A different coded label such as QR code label or other identifier may be disposed on each cart 22 to make each cart distinguishable from another cart for the robot 20 using the robot's vision system 76.

Referring again to FIG. 1, the cart pulling robot 20 is further configured to autonomously navigate through a navigating route 66 to carry the cart 22 to a side of field 30 from a plurality of fields 14 within the system 10. The field 30 from the plurality of fields 14 may be configured to have a rectangular shape or any other shape. The plurality of fields 14 may include indoor fields or outdoor fields. Once the cart 22 arrives at a side of field 30, the plurality of pots 26 are transported from the cart 22 and are deposited to the field 30 in an organized manner using at least east one pot transporting robotic apparatus 34 operating within the field 30.

Figure 3:
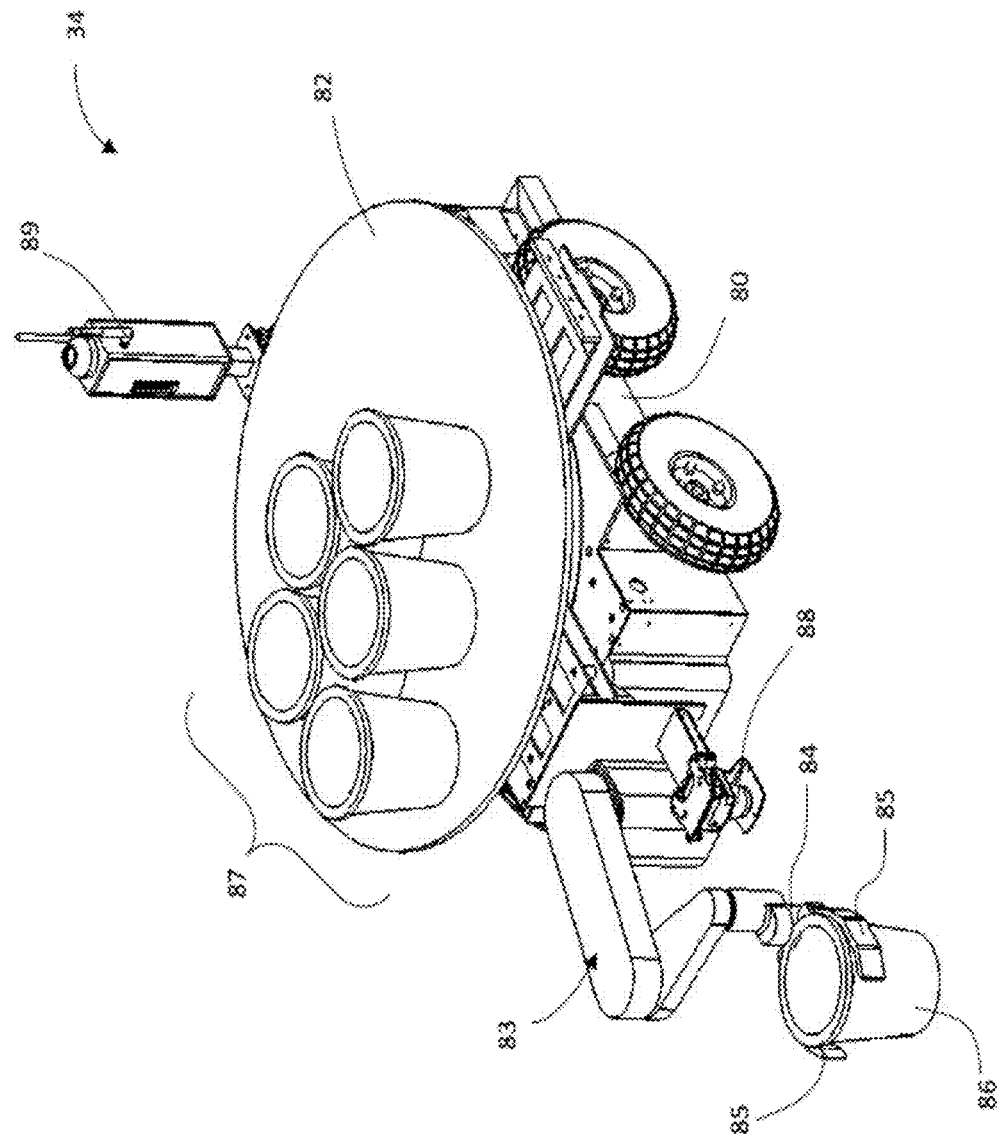
FIG. 3 is a perspective view of a pot transporting robot, according to an embodiment.

Referring now to FIG. 3, an embodiment of a pot transporting robot is presented generally at 34. The robot 34 includes a wheeled chassis 80, an article platform 82 disposed on the wheeled chassis 80 to store a plurality of pots 87 on the robot 34, and at least one manipulator 83 disposed on the wheeled chassis 80. A gripper end effector 84 is coupled to the manipulator 83 which includes a pair of fingers 85 to engage with and grasp a pot 86. Other embodiments of the end effector 84 may include vacuum cups and pneumatic grippers. The pot transporting robot 34 further includes at least one pot detection sensor 88 such as a LiDAR, Radar, or vision camera to assist the robot in pot detection and navigation within a field area. The apparatus 20 also includes, inside the wheeled chassis 80, a power supply unit to provide power for different electronics in the robot, a controller unit such as a portable computer to control all the processes of the robot, and a navigation sensor such as a GPS or ultra-wideband sensor to assist the robot in navigation through an environment (the power supply, the controller units, and the navigation sensors are not shown). The robot 34 further includes a Wi-Fi module 89 configured to connect the robot 34 to other robots and controllers and transmit signals and data to and from the robot 34.

Referring again to FIG. 1, multiple pot transporting robots 50 and 56 unload a plurality of pots 42 from the carts 44 and 46 and transport the pots for deposition at field 31. At field 31, the robots 50 and 56 may work cooperatively together to cause faster deposition of pots 42 onto the field 31. The robot 56 is unloading a plurality of pots 58 from the plurality of pots 42 from the carts 44 and 46 to the article platform 59 of the robot 56. The robot 50 is already depositing a plurality of pots 52 from the pots 54 on the article platform 55 of the robot 50.

A cart pulling robot of the current disclosure may be further configured to pull multiple carts that are connected in series to one another. For example, in the embodiment shown in FIG. 1, the cart pulling robot 40 is configured to pull carts 44 and 46. A cart pulling robot of the current disclosure is further configured to pull an empty cart to collect pots from a field at which the pots are ready for collection. For example, the cart pulling robot 60 has carried the empty cart 61 to the field 32.

At field 32 a plurality of pots 62 is ready to be collected from the field 32. A pot transporting robot 63 is configured to collect the pots from a field 32 and load the pots to the cart 61. The pot transporting robot 63 may perform the process of pot collection in several rounds until all of the pots in the field 32 are collected. At each round, the pot transporting robot 63 transports at least one pot 64 from the plurality of pots 62 from a collection point in the field 32 to the cart 61. Once the cart 61 is filled with the collected pots, the cart pulling robot 60 may carry the cart 61 to a different station for other processes in the system 10. For example, the cart 67 which is filled by collected pots is carried by the cart pulling robot 66 to either a shipping center 16 for shipment to outside of the nursery through a route 69 or back to the potting station 12 through a route 68 for further processes on the pots such as repotting the collected plants in bigger pots.

The system 10 further includes a control center 17. The control center 17 is configured to coordinate tasks among different robots within the system 10. The control center 17 may send commands and tasks to a robot and receive information from a robot regarding the robot's status. The communication between the control center 17 and each robot is established using, for example, a Wi-Fi module 18 included in the control center 17. Besides the control center 17, an operator 36 could communicate with a robot through a Wi-Fi enabled device 37. The operator 36 could receive information on the status of a robot, for example, the work hours of a robot or the errors a robot has generated.

The operator 36 could also communicate with the control center 17 to obtain information on the process of pot transportation, for example, the number of pots being deposited, collected or shipped.

The control center 17 may include or otherwise be in communication with a device management server, such as device management server 512 of FIG. 5 described below.

The system 10 further includes a charging station 15 which is configured to provide charging means for the batteries inside each robot in the system 10.

Figure 4:
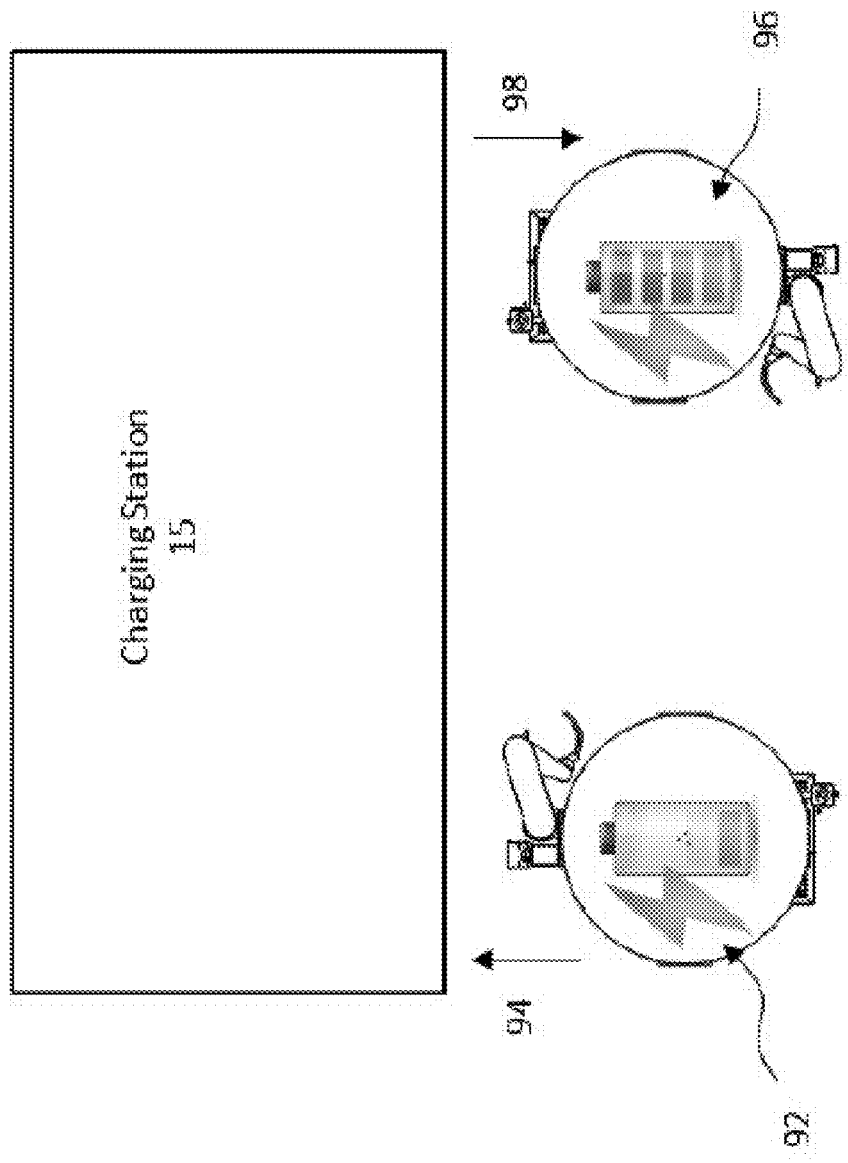
FIG. 4 is a plan view of a charging station, according to an embodiment.

Referring to FIG. 4, once the battery is low in a robot 92, the robot may pause its task and navigate to enter the charging station 15 in direction 94 while once the battery is fully charged in a robot 96, the robot 96 may exit the charging station in direction 98 and return to its paused task.

Figure 1B:
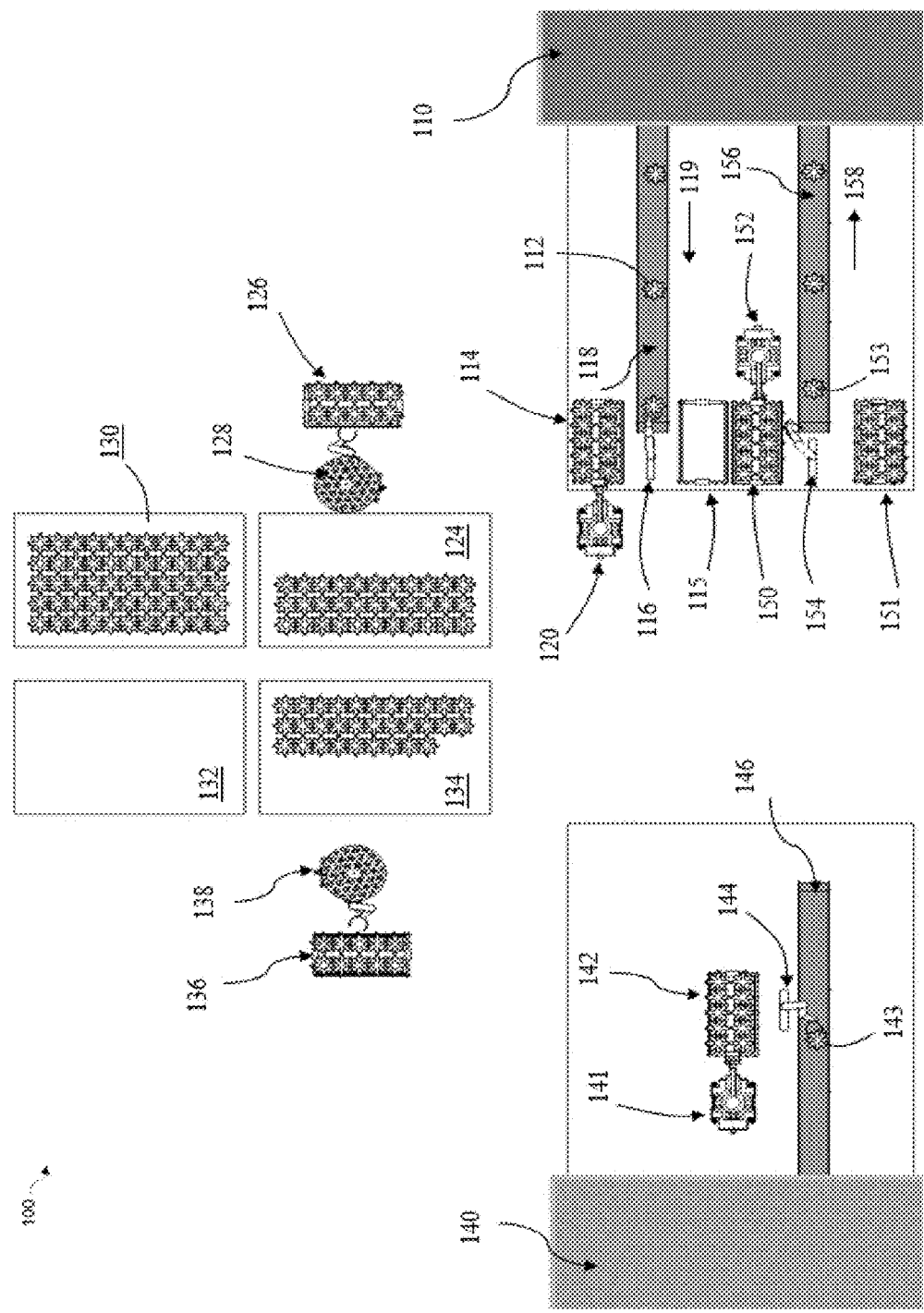
FIG. 1B is a top view of an embodiment of a plant management and distribution system with an application in potted plant nursery, according to an embodiment.
Figure 1C:
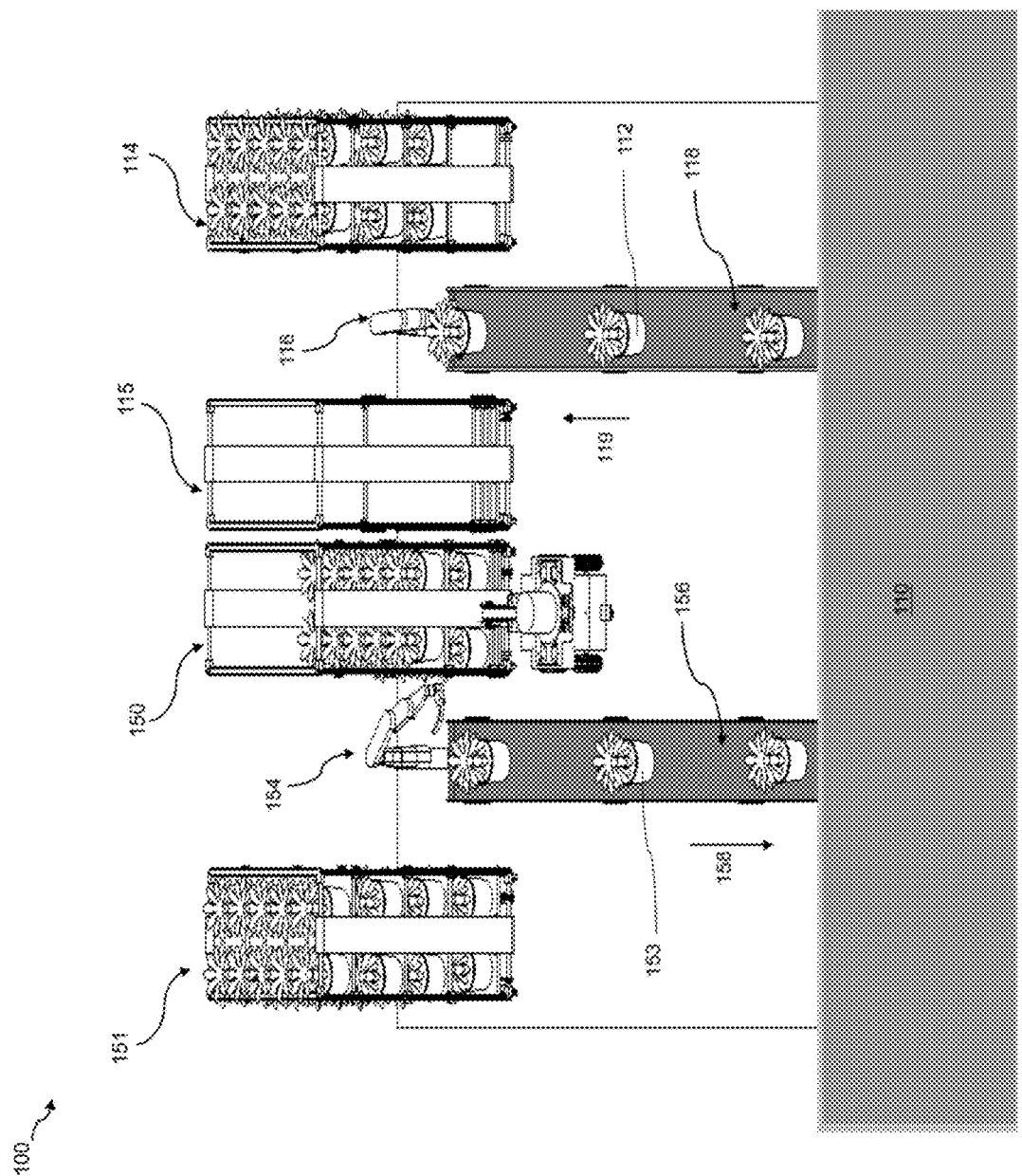
FIG. 1C is a perspective view from the potting station of FIG. 1B.

Referring now to FIGS. 1B and 1C, shown therein are top and close-up perspective views, respectively, of a region in a greenhouse nursery, according to an embodiment. The embodiment shown in FIGS. 1B and 1C shows the capability of a system 100 of the current disclosure in automating the transportation of potted plants. The system 100 loads a plurality of articles 112 (e.g. potted plants) from a loading zone in a potting station (primary facility) 110 to a multi-shelf cart 114 using a robotic loader unit 116. The plurality of potted plants 112 are transported on a conveyor belt 118 from inside the potting station 110 to a vicinity of the loader unit 116 in direction 119. The loader unit 116 is configured to automatically load the potted plants 112 one by one from the conveying belt 118 to the multi-shelf cart 114.

Once the cart 114 is loaded with a plurality of potted plants 112, the cart 114 is automatically transported to a greenhouse bay (destination facility) using a cart-pulling robot 120, for example, for further growth and storage of the plant inside a pot. An empty cart 115 is available near the conveyor belt 118 so that once the cart 114 is filled with articles 112 and transported toward the destination facility, the unloader unit 116 can continue loading articles 112 to the cart 115.

A multi-shelf cart 126 is transported to a first bay 124. The cart 126 is being unloaded to the first bay 124 using a pot transporting robotic unit 128.

The system 100 includes a second bay 130 that is fully loaded with potted plants 112. The system 100 also includes a third bay 132 that is empty and ready to store a plurality of potted plants 112. The system 100 also includes a fourth bay 134 that houses a plurality of grown potted plants 112 where the plants are ready to be transported to another destination such as a retail store. The plurality of grown potted plants 112 in the fourth bay 134 are loaded to a multi-shelf cart 136 using a pot transporting robotic unit 138. In the embodiment shown in FIG. 1, the robotic unit 138 is the same as the robotic unit 128 and is configured to collect and load the plurality of potted plants 112 from the fourth bay 134 to the cart 136. In other embodiments of the system 100, fewer or additional bays may be included.

Once the cart 136 is loaded with grown potted plants 112, the cart 136 may be transported to a shipping facility 140 or to the potting station 110 for further processing on the grown potted plant 112, such as transplanting the grown potted plant 112 to a bigger pot.

At the shipping facility 140, the multi-shelf cart 142 is transported in using the cart-pulling robot 141. Potted plant 143 may be automatically unloaded from the multi-shelf cart 142, to a conveying belt 146, using a robotic unit 144.

At the potting station 110, a multi-shelf cart 150 is returned from a greenhouse bay using a cart puller robot 152. A plurality of potted plants 153 are unloaded from the cart 150 to an input conveyor belt 156 using an unloader unit 154. The conveyor belt 156 conveys the potted plant 153 inside the potting center 110 in direction 158 for further processing of the plants. Once the cart 154 is fully unloaded, another cart 151, loaded with potted plants, is available for unloading using the robotic unloader unit 154.

FIG. 1C illustrates a close-up perspective view of the conveyor belts of the potting station 110 of FIG. 1B.

Figure 5:
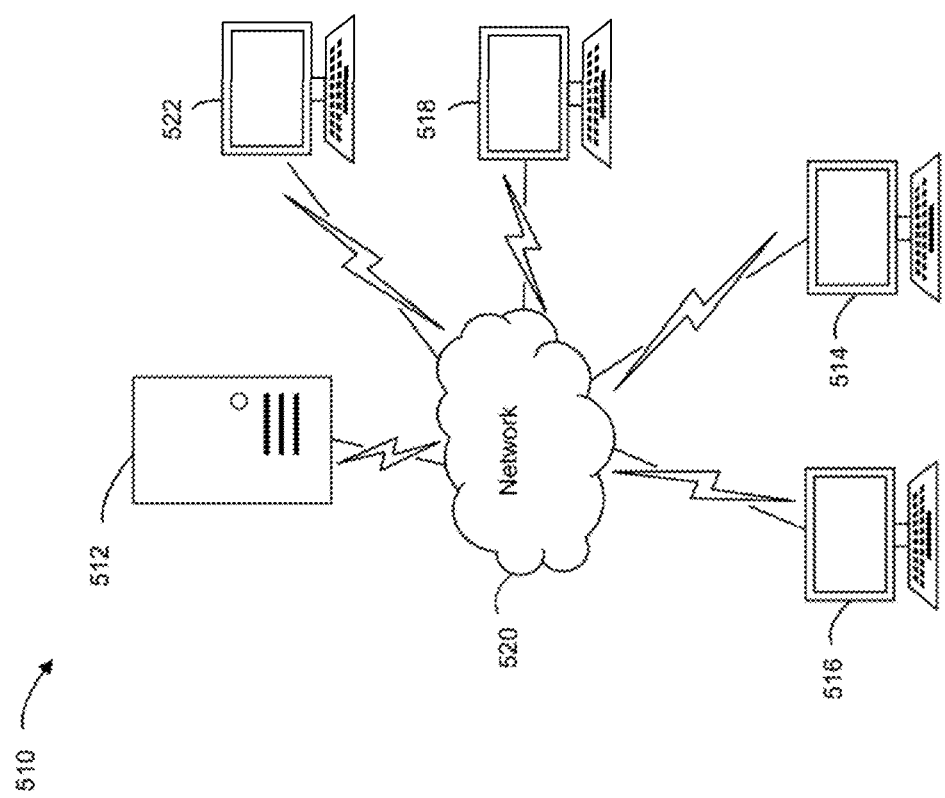
FIG. 5 is a schematic diagram of a system for managing and tracking usage of a robotic device, according to an embodiment.

Referring now to FIG. 5, shown therein is a block diagram illustrating a system 510 for managing and tracking usage and performance of robotic devices, in accordance with an embodiment. The system 510 may provide a means for a user to recruit robotic devices to perform tasks, such as article transport, for the user's benefit without a need to purchase the robotic devices. In a particular embodiment, the system 10 may be configured to manage and track autonomous plant transportation at a nursery site via robotic plant transporting devices.

The system 510 includes a device management server platform 512, which communicates with a plurality of user devices 516, 518 and 522 via a network 520. The user devices include a task beneficiary (or task requestor) device 516, a task performing device 518, and a device supplier device 522.

The server platform 512 may be a purpose-built machine designed specifically for managing and tracking usage of robotic devices.

The task performing device 518 may be a device configured to receive task instructions (e.g. a computer program or the like) defining a task and perform the task according to the task instructions. Performance of the task by the device may be automatic, semi-autonomous, autonomous, or the like. In some cases, performance of the task by the device may include input by a human operator.

The task performing device 518 may be a robotic device (or have robotic components) or an IoT-enabled machine. The IoT-enabled machine may be a machine with an IoT box (or network-enabled module) communicatively connected to the machine (e.g. machine 1550 and IoT box 1510 of FIG. 15B described below).

The robotic device may be configured to autonomously perform a task (e.g. transporting an article) according to task instructions. For example, the robotic device 518 may be the cart pulling robot 20 or plant transporting robot 34 of FIG. 1.

The task performing device 518 may be an article management device configured to perform an article management task. The article management task relates to a target article (or managed article) that is the subject of the task (i.e. the task is performed on or for the target article). In embodiments, the article may be a plant or an item of luggage. The article management task may be any task related to the handling, direction, or control of the target article such as article transportation or article processing.

In an embodiment where the target article is a plant, the article management device can be a plant management device such as a plant transportation device or a plant processing device. In some cases, a plant transportation device may include a plant processing component. In such cases, the plant management device may be both a plant transportation device and a plant processing device and may perform transportation and processing tasks at the same or different times. The plant transportation device performs plant transportation task such as transporting a target plant from one location to another at a site. The plant processing device performs a processing task on the target plant. The processing task may be, for example, potting the target plant or trimming or pruning the plant.

The task beneficiary device 516 is associated with a task beneficiary. The task beneficiary is an entity that benefits from performance of tasks by the task performing device 518. The task beneficiary may be a customer or client of the server 12 operator. The task beneficiary may be a site operator (e.g. owner or operator of a nursery, warehouse, airport, etc.) that wants to "recruit" the task performing device 518 to perform a task for its benefit at the site. The task beneficiary device 516 and the task performing device 518 may both be located at the site and in communication with one another.

The device supplier device 522 is associated with a device supplier, such as a robotic device supplier. The device supplier supplies the task performing device 518 to the task beneficiary and may be a robotic device manufacture, robotic device distributor, or the like.

Advantageously, the device supplier may own the task performing device 518 and use the system 510 to both monitor performance of the task performing device 518 and monitor usage of the task performing device 518 and payment therefor. Similarly, the task beneficiary may use the system 510 to recruit the use and performance of the robotic device 516 and pay for the work performed by the robotic device 516. Using the system 510, the task beneficiary may be able to forgo costly capital expenditures associated with owning and maintaining robotic devices 516.

The server platform 512 and devices 516, 518 and 522 may be a server computer, desktop computer, notebook computer, tablet, PDA, smartphone, or another computing device. The devices 512, 516, 518, 522 may include a connection with the network 520 such as a wired or wireless connection to the Internet. In some cases, the network 520 may include other types of computer or telecommunication networks. The devices 512, 516, 518, 522 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 520.

Input device may include any device for entering information into device 512, 516, 518, 522. For example, input device may be a keyboard, keypad, cursor-control device, touchscreen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 512, 516, 518, 522 may include multiple of any one or more of processors, applications, software modules, second storage devices, network connections, input devices, output devices, and display devices.

Although devices 512, 516, 518, 522 are described with various components, one skilled in the art will appreciate that the devices 512, 516, 518, 522 may in some cases contain fewer, additional or different components. In addition, although aspects of an implementation of the devices 512, 516, 518, 522 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 512, 516, 518, 522 and/or processor to perform a particular method.

Devices such as server platform 512 and devices 516, 518 and 522 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 512, 516, 518, 522 may send information to the server platform 512. For example, a user using the device 518 may manipulate one or more inputs (e.g. a mouse and a keyboard) to interact with a user interface displayed on a display of the device 518. Generally, the device may receive a user interface from the network 520 (e.g. in the form of a webpage). Alternatively or in addition, a user interface may be stored locally at a device (e.g. a cache of a webpage or a mobile application).

Server platform 512 may be configured to receive a plurality of information, from each of the plurality of devices 516, 518, 522.

In response to receiving information, the server platform 512 may store the information in storage database. The storage may correspond with secondary storage of the devices 516, 518 and 522. Generally, the storage database may be any suitable storage device such as a hard disk drive, a solid state drive, a memory card, or a disk (e.g. CD, DVD, or Blu-ray etc.). Also, the storage database may be locally connected with server platform 512. In some cases, storage database may be located remotely from server platform 512 and accessible to server platform 512 across a network for example. In some cases, storage database may comprise one or more storage devices located at a networked cloud storage provider.

Figure 6:
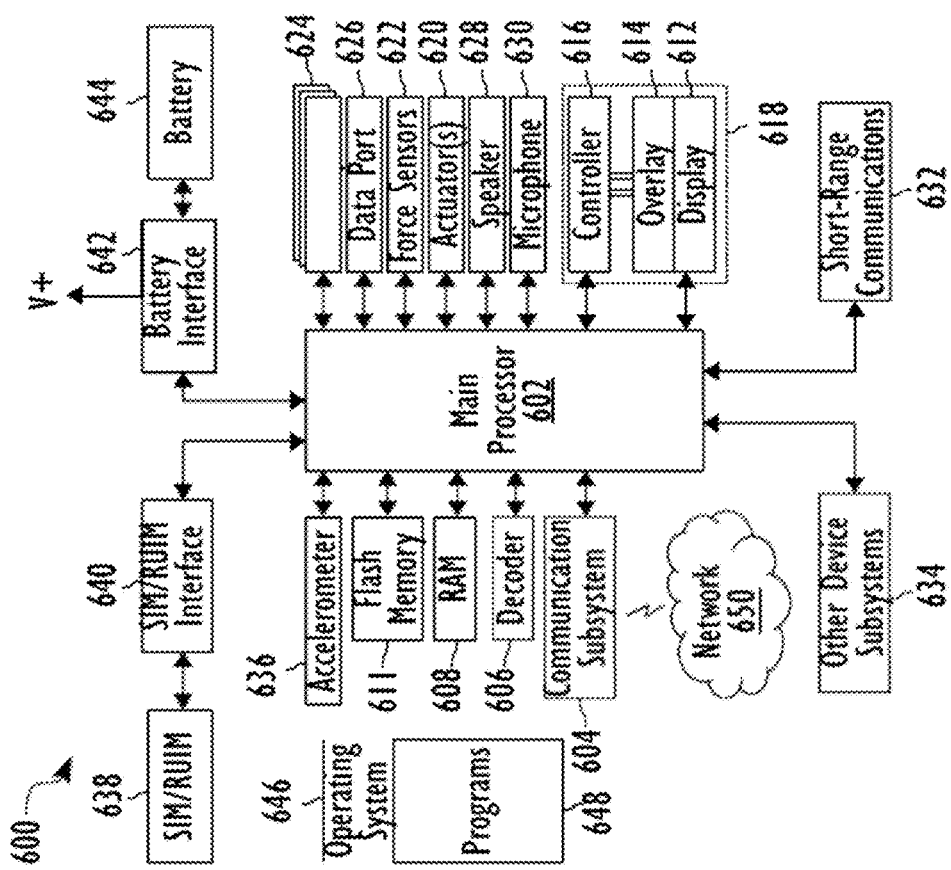
FIG. 6 is a block diagram of a computing device of FIG. 5.

FIG. 6 shows a simplified block diagram of components of a device 600, such as a mobile device or portable electronic device. The device 600 includes multiple components such as a processor 602 that controls the operations of the device 600. Communication functions, including data communications, voice communications, or both may be performed through a communication subsystem 604. Data received by the device 600 may be decompressed and decrypted by a decoder 606. The communication subsystem 604 may receive messages from and send messages to a wireless network 650.

The wireless network 650 may be any type of wireless network, including, but not limited to, data-centric wireless networks, voice-centric wireless networks, and dual-mode networks that support both voice and data communications.

The device 600 may be a battery-powered device and as shown includes a battery interface 642 for receiving one or more rechargeable batteries 644.

The processor 602 also interacts with additional subsystems such as a Random Access Memory (RAM) 608, a flash memory 610, a display 612 (e.g. with a touch-sensitive overlay 614 connected to an electronic controller 616 that together comprise a touch-sensitive display 618), an actuator assembly 620, one or more optional force sensors 622, an auxiliary input/output (I/O) subsystem 624, a data port 626, a speaker 628, a microphone 630, short-range communications systems 632 and other device subsystems 634.

In some embodiments, user-interaction with the graphical user interface may be performed through the touch-sensitive overlay 614. The processor 602 may interact with the touch-sensitive overlay 614 via the electronic controller 616. Information, such as text, characters, symbols, images, icons, and other items that may be displayed or rendered on a portable electronic device generated by the processor 602 may be displayed on the touch-sensitive display 618.

The processor 602 may also interact with an accelerometer 636 as shown in FIG. 1. The accelerometer 636 may be utilized for detecting direction of gravitational forces or gravity-induced reaction forces.

To identify a subscriber for network access according to the present embodiment, the device 600 may use a Subscriber Identity Module or a Removable User Identity Module (SIM/RUIM) card 638 inserted into a SIM/RUIM interface 640 for communication with a network (such as the wireless network 650). Alternatively, user identification information may be programmed into the flash memory 610 or performed using other techniques.

The device 600 also includes an operating system 646 and software components 648 that are executed by the processor 602 and which may be stored in a persistent data storage device such as the flash memory 610. Additional applications may be loaded onto the device 600 through the wireless network 650, the auxiliary I/O subsystem 624, the data port 626, the short-range communications subsystem 632, or any other suitable device subsystem 634.

For example, in use, a received signal such as a text message, an e-mail message, web page download, or other data may be processed by the communication subsystem 604 and input to the processor 602. The processor 602 then processes the received signal for output to the display 612 or alternatively to the auxiliary I/O subsystem 624. A subscriber may also compose data items, such as e-mail messages, for example, which may be transmitted over the wireless network 650 through the communication subsystem 604.

For voice communications, the overall operation of the portable electronic device 600 may be similar. The speaker 628 may output audible information converted from electrical signals, and the microphone 630 may convert audible information into electrical signals for processing.

Figure 7:
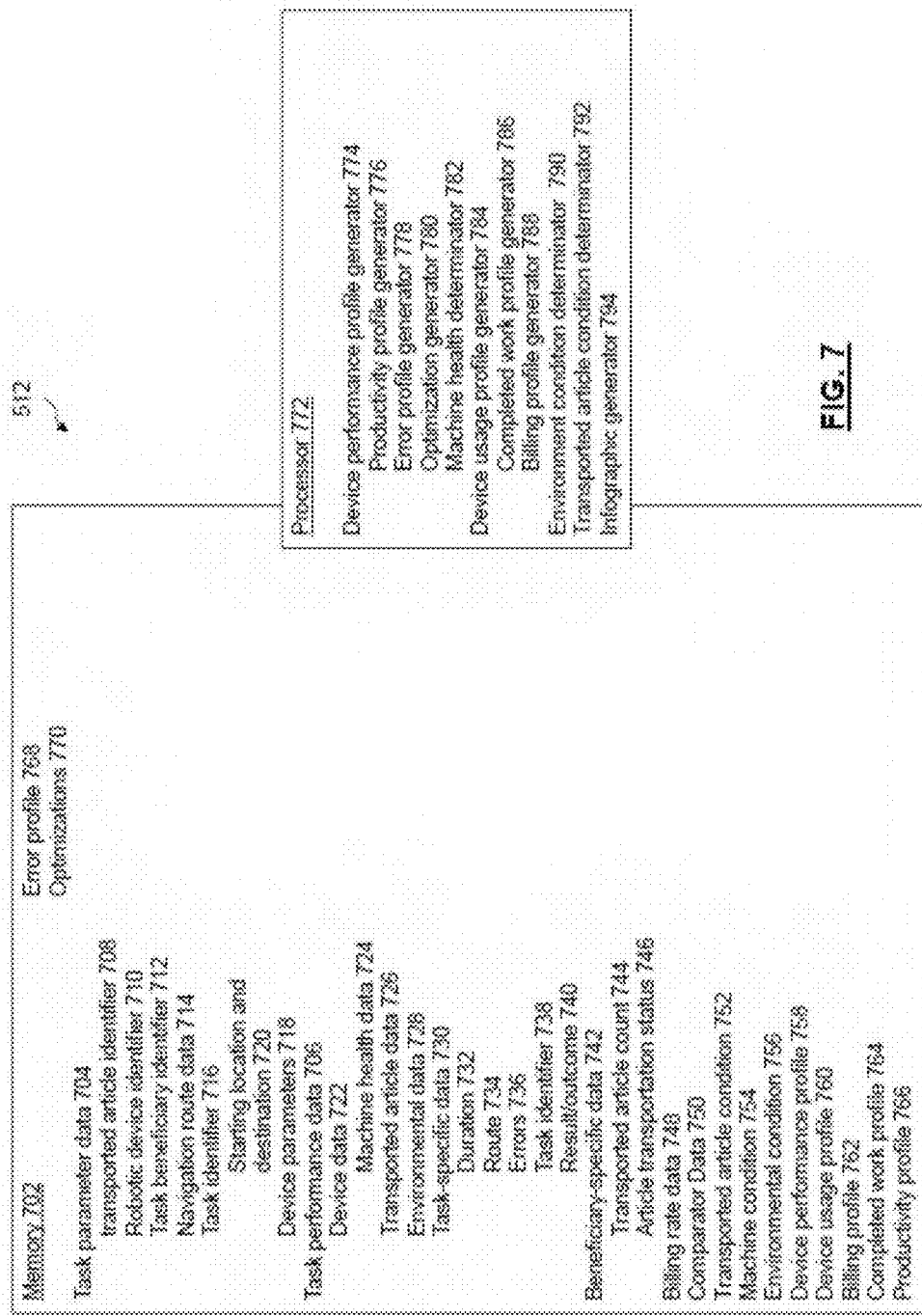
FIG. 7 is a block diagram of a device management server, according to an embodiment.

Referring now to FIG. 7, shown therein is the device management server 512 of FIG. 5, according to an embodiment.

The server 512 includes a memory 702 storing task parameter data 704 and task performance data 706.

Task parameter data 704 includes data about the task to be performed by a robotic device, such as task performing device 518 of FIG. 5. Task parameter data 704 may be included in a task order issued to the robotic device 518. The task order may be issued by the server 512 or by a task beneficiary device such as task beneficiary device 516 of FIG. 5). In some cases, the server 512 may generate task parameter data 704 in response to receiving the task order.

The task parameter data 704 is data about the task to be performed that is generally known prior to performance of the task. The task parameter data 704 may define and/or describe the task. The task parameter data 704 may facilitate both performance of the task by the robotic device 518 and tracking of performed tasks by the server 512. Task parameter data 704 may include a transported article identifier 708, a device identifier 710, a task beneficiary identifier 712, a task identifier 716, and device parameters 718.

The task parameter data 704 may also include navigation route data 714 defining a route to be taken be the robotic device 518.

The task identifier 716 may include a start location and a destination 720 (e.g. for a transportation task).

Task parameter data 704 may also include other task related information needed by the robotic device 518 to perform the task. For example, task parameter data 704 may include task instructions or task instructions may be retrievable based on the task parameter data 704. Task parameter data 704 (or a portion thereof) is used by the robotic device 518 to perform the task.

Task performance data 706 includes data collected, generated, or logged by the robotic device 518 during the performance of the task. The task performance data 706 is transmitted to the server 512 during (e.g. in real-time) or at or after completion of the task.

Task performance data 706 may include device data 722. Device data 722 includes data about the condition, health, state, or operation of the robotic device 518 or components thereof.

The device data 722 may be collected and logged using a plurality of sensors on or integrated within the robotic device 518.

The device data 722 may include machine health data 724. Machine health data 724 includes data about the health or condition of the robotic device 518 or component thereof and may be derived from machine health signals. Machine health data 724 may include operating temperature data, a current drawn data, and vibration data for the robotic device 518. The machine health data 724 may include a machine health signature derived from the machine health signals.

Task performance data 706 may include transported article data 726. Transported article data 726 includes data about an article transported by the robotic device 518. The transported article data 726 may include image or other sensor data of the transported article. The transported article data 726 is collected by the robotic device 518, for example via an onboard imaging system, sensors, or the like.

Task performance data 706 may include environmental data 728 about a site at which the task is performed. The environmental data 728 may include temperature, atmospheric composition, ambient light, direct light, humidity, and other measurements relevant for maintaining environmental conditions at the site. The environmental data 728 may be relevant to task performance by the robotic device 518 (e.g. certain environmental conditions are less favourable to the performance of the task) or to the condition of articles to be transported.

Task performance data 706 may include task-specific data 730. Task-specific data 730 relates to the task itself and performance thereof. The task-specific data includes a task duration 732732 (time elapsed during task performance), navigation route 734 (what route was taken to perform the task), error data 736 (errors made by the robotic device 518 during performance of the task), a task identifier 738, and a task result 740 (outcome of task).

The memory 702 also stores beneficiary-specific data 742. Beneficiary-specific data 742 includes data of particular relevance to task beneficiaries such as a transported article count 744 (number of articles transported for the task beneficiary by robotic devices 518). The beneficiary-specific data 742 may also include article transportation status data 746. The article transportation status data 746 describes a transportation status for an article transported for the beneficiary. The transportation status data 746 may allow the task beneficiary to keep track of where articles are in a chain of transportation (e.g. ready to be shipped) and may include a current article location.

The memory 702 also stores billing rate data 748. The billing rate data 748 may include one or more predetermined billing rates for performance of tasks by the robotic device 518.

The memory 702 also stores comparator data 750. The comparator data 750 may include standards or thresholds against which certain task performance data 706 can be compared in order to make a determination. The comparator data 750 may include an article condition comparator, a robotic device condition comparator, and an environment condition comparator.

The memory 702 also stores a plurality of profiles generated by the server 512. Generally, the profiles are generated by the server 512 from data received from the robotic device 518 and other sources. The profiles may be as simple as a single value or may be more complex and include a plurality of values. The profiles may be capable of display to a user or may be processable by a machine without human input.

The profiles include a device performance profile 758, a device usage profile 760, a completed work profile 764, a billing profile 762, a productivity profile 766, and an error profile 768.

The memory also stores optimizations 770 that may be derived or determined from one or more profiles (e.g. productivity profile 766, error profile 768).

The server 512 includes a processor 772 in communication with the memory 702. The processor 772 is configured to implement a plurality of modules and perform a plurality of functions described in detail below.

The processor 772 includes a device usage profile generator 784. The device usage profile generator 784 receives a subset of the task performance data 706 relevant to usage of the robotic device 518 and generates a device usage profile 760. The usage profile 760 may describe the usage of the robotic device 518 by the task beneficiary for the performance of tasks.

The usage profile generator 784 includes a completed work profile generator 786 and a billing profile generator 788.

The completed work profile generator 786 generates a completed work profile 764 (e.g. work report) describing the work and tasks performed by the robotic device 518 from task performance data 706. The work profile generator 786 may also use task parameter data 704. The completed work profile 764 may be for a single robotic device 518 or for a plurality of robotic devices 518. In a particular embodiment, the completed work profile generator 786 accesses a transported article count 744 for the robotic device 518 and the device identifier 710 to generate the completed work report 764.

The billing profile generator 788 generates a billing profile describing the cost of work performed by the robotic device 518. The billing profile 762 includes a billable amount payable by the task beneficiary. The billing profile generator 788 access the completed work profile 764, beneficiary identifier 712, and billing rate data 748 to generate the billing profile 762.

The processor 772 includes a device performance profile generator 774. The device performance profile generator 774 receives a subset of the task performance data 706 relevant to performance of the robotic device 518 (e.g. device data 722, error data 736) and generates a device performance profile 758 describing a performance characteristic of the robotic device 518. The device performance profile generator 774 may also access data other data such as comparator data 750 to generate the performance profile 758.

The performance profile generator 774 includes a productivity profile generator 776, an error profile generator 778, an optimization generator 780, and a machine health determinator 782.

The productivity profile generator 776 generates a productivity profile 766 describing a productivity level for the robotic device 518. The productivity profile generator 776 accesses task performance data 706 to generate the productivity profile 766. In an embodiment, the productivity profile generator 776 receives as input the completed work profile 764 (or a portion thereof) and task duration data 732 and generates the productivity profile 766.

The error profile generator 778 is configured to receive error data 736 and other task performance data 706 and generate an error profile 768. The error profile 768 may include one or more error rates. A given error rate may be associated with a particular action performed by the robotic device 518, such as a manipulator arm movement. The error profile provides insight into what errors and being made by the robotic device 518 and may allow the recipient of the profile, such as a device supplier, to work to remedy the errors.

The optimization generator 780 generates one or more optimizations 770 that can be transmitted to and used by the robotic device 518 to improve performance of tasks such as article transport.

The optimization generator 780 may include one or more machine learning algorithms or models configured to receive task performance data 706 and output an optimization 770.

In a particular embodiment, the optimization generator 780 includes a neural network. The neural network includes an input layer, at least one hidden layer, and an output layer. The task performance data 706 is provided at the input layer and the neural network is configured to generate the optimization 770 at the output layer.

The optimizations 770 may include task-based optimizations (e.g. performance of task, route taken to transport an article, etc.) and device-based optimizations (e.g. configurations and device settings). Once generated, the optimizations 770 can be provided to the robotic device 518 to be implemented.

The machine health determinator 782 is configured to determine a machine health state or condition 754 for the robotic device 518. The machine condition 754 can be transmitted to the device supplier device 522 (or other appropriate device or entity) for subsequent review and action (if necessary).

In some cases, the machine health determinator 782 may determine a modification that should be made to the robotic device 518 and notify the device supplier or task beneficiary or may even transmit a signal to the robotic device 518 for the device 518 to adjust its settings.

In another case, the machine health determinator 782 may consider the machine condition output 754 in the assignment of tasks to the robotic devices 518. For example, upon determining a machine condition 754 is poor, the machine health determinator may automatically assign subsequent tasks to another device 518 with an acceptable machine health condition 754.

The machine health determinator 782 receives machine health data 724 and a device identifier 710 and determines the machine condition 754 for the robotic device 518. In an embodiment, the machine health determinator 782 includes one or more machine learning algorithms or models for determining or analyzing a machine health signature from machine health data 724 provided by the robotic device 518 to the server 512. The machine health determinator 782 may determine, based on the machine health signature, a modification to the device 518 setting and transmit a signal to make such changes to the robotic device 518, device supplier device 522, or beneficiary device 516.

The machine health determinator 782 may access the comparator data 750 to determine the machine condition 754, for example, by comparing the machine health data 724 to the comparator data 750.

The processor 772 also includes an environment condition determinator 790 and a transported article condition determinator 792.

The environment condition determinator 790 is configured to analyze the environmental data 728 and determine an environmental condition 756 for the site. The environmental condition 756 may indicate whether the site environment is suitable and/or if any changes to the environment should be made (and may include suggested modifications). The output of the environment condition determinator 790 may be provided to the task beneficiary device 516 (or other site operator device, if appropriate) for review and subsequent action. In an example, the environment condition determinator 790 may receive environmental data 728 including humidity data and determine, by comparison with the comparator data 750, that the humidity is too high. The environment condition determinator may then send a notification to the site operator to adjust the humidity level at the site.

The transported article condition determinator 792 is configured to analyze transported article data 726 and determine an article condition 752. In doing so, the article condition determinator 792 may compare the transported article data 726 to the comparator data 750 to determine the article condition 752. If the article condition falls outside what is considered acceptable, the article condition determinator 792 may generate a notification that can be sent by the server 512 to the task beneficiary for subsequent action.

The processor 772 also includes an infographic generator 794. The infographic generator 794 may take one or more processor 772 outputs, such as the aforementioned profiles, and generate a human-readable infographic comprising a visualization of information relevant to the user that can be displayed at the user device via a user interface.

In an embodiment, the server 512 may be used to manage and track autonomous transportation of articles in an airport.

The task beneficiary and site is an airport. The transported articles may be luggage. Third parties connected to the server 512 may include companies who provide logistical solutions (such as Swisslog). The device supplier may be a company that provides luggage transport devices (such as easymile or TLD).

The server 512 may manage or facilitate autonomous transportation of baggage from a baggage collection point (from passengers). The luggage may be palletized at or near the baggage collection point using a robotic arm. Groups of baggage may be placed into wagons. Wagons carrying the baggage may navigate to a target airplane using an automated wagon-puller. Groups of baggage may be dispatched to the target airplane using another robotic arm.

Data communicated between the various robotic devices (e.g. conveyor machines, robotic arms, wagon-puller, etc.) and the server 512 may include: identity of the baggage and its corresponding weight and size, destination airport of the baggage, target airplane of the baggage, time remaining to flight, maximum pulling capacity of a wagon-puller, battery life of a wagon-puller, number of baggage being palletized by a robotic arm, and weight of cargo dispatched to a target airplane in real-time. The server 512 may perform various optimizations (e.g. optimizations 770) using data analytics including: optimizing the transportation time of baggage of a certain flight from the baggage collection point to the target airplane and optimizing the order of baggage loadings to the target airplane based on the final destination of the baggage and intermediate stops of the airplane.

Referring now to FIG. 8, shown therein is a flowchart of a method 800 of tracking and analyzing usage of a robotic device (e.g. task performing device 518 of FIG. 5), according to an embodiment. The method 800 may be implemented using the device management server 512 of FIG. 5.

At 802, the server 512 receives a task order notification from the robotic device 18. The task order notification includes task parameter data 704 and task beneficiary data. In some cases, the server 512 may issue the task order to the robotic device 18. In such cases, the server 512 may already have the task parameter data 704 and task beneficiary data (e.g. server 512 may receive the task parameter data 704 from a task beneficiary or generate the task parameter data 704 itself).

In embodiments where the server 512 is controlling the performance of tasks by the robotic device 518, the server 512 instructs the robotic device 518 to perform the task.

At 804, the server 512 receives task performance data 706 from the robotic device 518. The robotic device 518 may transmit the task performance data 706 during performance of the task (e.g. in real-time or in batches) or at completion of the task. The server 512 stores the task performance data 706.

At 806, the server generates a completed work profile 764 for the robotic device 518. The server 512 may determine a total amount of work performed by the robotic device (e.g. number of articles transported) and associated the work performed with a device identifier 710 for the robotic device. The completed work profile 764 (or a portion thereof) may be sent to one or more entities such as the task beneficiary and the device supplier.

At 808, the server 512 generates a billing profile 762 for the robotic device 518. The billing profile 762 includes a billable amount reflecting the cost of the work performed by the robotic device 518. The server 512 retrieves billing rate data 748, which may be based on task parameter data 704 (e.g. what type of task is being performed), and generates the billable amount using the billing rate and the completed work profile 764. The billing profile 762 may be sent to a task beneficiary device 516 for review and payment by the task beneficiary.

At 810, the server 512 generates a productivity profile 766 for the robotic device 518. The server 512 includes productivity data determined using the completed work profile 764 and task duration data 732. The server 512 may transmit the productivity profile 766 to the device supplier device 522 for review by the device supplier. In some cases, the server 512 may feed productivity data from the productivity profile 766 into a machine learning model to determine a performance optimization 770. In a particular case, the productivity data is fed into a neural network configured to determine an optimization 770 from the productivity data.

At 812, the server 512 generates an error profile 768 for the robotic device 518. In some cases, an error profile 768 may be generated for a particular task across multiple devices 518. The server 512 uses error data 736 logged during performance of the task and received as task performance data 706 at 804 along with other task performance data 706 to determine an error rate. The server 512 transmits the error profile 768 to the device supplier device 522 for review by the device supplier.

Figure 9A:
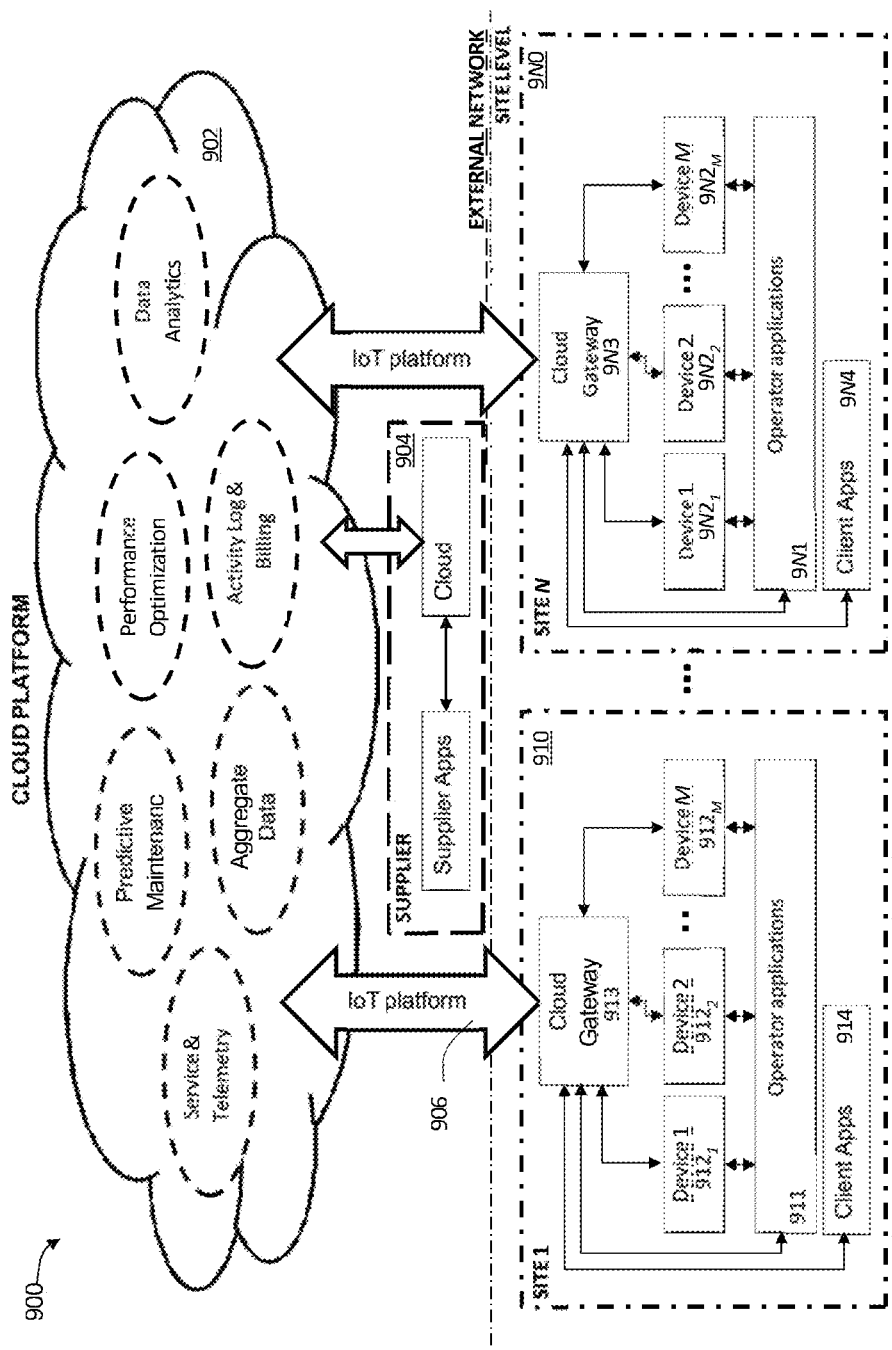
FIG. 9A is a schematic view of a general architecture of a cloud server, according to an embodiment.

Referring now to FIG. 9A, shown therein is a schematic diagram illustrating an example architecture of a device management and tracking system 900 using a cloud server, according to an embodiment.

The system 900 includes a device management server 902. While the device management server 902 is shown in FIG. 9 as a cloud server, other embodiments of device management server 902 are contemplated such as, for example, where device management server 902 is located on site. The cloud server may be part of the control center 17 of FIG. 1 or may be in communication with the control center 17. The cloud server may be remote from system 10 of FIG. 1.

The cloud server 902 includes a memory that stores executable components and a processor, operatively coupled to the memory, that executes executable components.

The cloud server 902 may be in communication with each robot in the system 10. The cloud server may be in communication with other aspects of the system 10 such as the potting station 12 or devices therein such as a soil dispensing machine or seeding machine, charging station 15, shipping station 16, control center 17 (if the cloud server 902 is not the control center 17), cart pulling robot 20, and carts 22, for example.

The system 900 includes a cloud server 902 and a device supplier device 904 linked to a device supplier. The device supplier may be the original creator of the robotic device (e.g. AIS) or a robotic device distributor (e.g. a partner or licensed distributor, such as Agronomix).

The system 900 also includes a plurality of sites. The sites include N different sites 910, 920, and so on up to site 9N0. The site may be a nursery, airport, warehouse, storage facility, or the like.

Each site 910 includes a plurality of M devices $912_1$, $912_2$, through $912_M$. The devices may be robotic devices or IoT-enabled machines. The devices may be task performing devices (e.g. task performing device 518 of FIG. 5). The devices 512 may be configured to receive task instructions defining a task and perform the task according to the task instructions. Performance of the task by the device 512 may be automatic, semi-autonomous, autonomous, or the like. In some cases, performance of the task by the device may include input by a human operator.

Each device may interact with an application 911, such as an application for issuing commands to the devices. Each device may also interact with a cloud gateway 913. The cloud gateway 913 communicates with the cloud server 902 through an IoT platform 906 and using Application Program Interfaces (APIs).

Applications 911 may include operator applications provided by the device supplier to operators for issuing tasks to the devices. The applications 911 may include third party applications for interacting with third party devices or any other applications.

Applications 911 may act as an interface for human operators to interact with the devices 912 and the cloud server 902 through gateway 913.

Applications 911 may be in communication with devices 912 directly, or in some cases, indirectly. In a case of indirect communication, the devices 912 may first interact with the cloud gateway 913 and cloud server 902, and then applications 911 retrieve data regarding the devices 912 from the cloud server 902 or cloud gateway 913.

Each site may also include a client application 914. The client application may be configured to oversee the operation of all devices and also communicate with the cloud server 902 through the cloud gateway 913.

Communication between devices 912, cloud gateway 913, operator applications 911 and client applications 914 may be via a wired connection such as an Ethernet connection or a wireless connection such as a WiFi connection.

Devices 912 may be robotic devices, or may be other devices such as sensors, or IoT boxes installed on existing machinery. In an embodiment, each device 912 is in communication with the cloud server 902 through gateway 913.

Gateway 913 may be a physical gateway hardware such as a local server or may represent a virtual gateway through APIs.

The device supplier device 904 also connects to the cloud server 902 through its own gateway. The device supplier device 904 may include device supplier applications. The device supplier applications may communicate with the cloud server through the supplier gateway.

Through the gateway 913, the cloud server 902 may provide services such as Service & Telemetry, Predictive Maintenance, Performance Optimization, Billing, and communication between operators and suppliers, for example. The cloud server 902 may also aggregate data and store activity logs to facilitate the delivery of these services. The activity log also facilitates billing.

The cloud server 902 implements a Robot-as-a-Service or Machine-as-a-Service business model. The cloud server 902 tracks how much work each device has completed, and for which client/task beneficiary.

The cloud server 902 also aggregates data to provide a variety of services. The services may include logistical, analytical, optimization, and forecasting services.

The services may include inventory management information. Inventory management information may include, for example, how many articles (e.g. potted plants) are transported, where the articles (e.g. pots) are located, and when the articles (e.g. pots) are or would be ready for shipment.

The services may include optimizing a navigation route of a robotic device (e.g. towing devices). The navigation optimization may include, for example, which towing unit is closer to certain cart and what is the optimal path from one location to a certain destination.

The services may include dispatching a robotic device such as a towing device in anticipation of a need for a robotic device performing a particular task arising, for example.

The cloud server 902 collects data from any or each of the aforementioned aspects of the system 900 (e.g. site devices, supplier devices, etc) and stores the collected information on cloud storage. The cloud server 902 may retrieve data from the connected devices in communication with the cloud server 902 (for example through a Wi-Fi connection), by accessing local memory on the connected devices via an API. This may include, for example, the cloud server 902 sending a request for information to the connected device, causing the device to respond with the requested information. The retrieved data may include process parameter data, device parameter data, object parameter data, environment parameter data, and client parameter data.

Process parameter data may include a process identity, a process outcome, a time spent or elapsed for task completion, errors, machine-to-machine interactions, machine-to-human interactions, transportation path taken, etc.

Device parameter data may include a device identity (any entity capable of communicating with the cloud server 902; including devices assigned to human operators), power consumption, a battery charge level, a time to full charge, device-specific operational parameters, machine health signature data, etc.

Object parameter data may include an object/article quantity and article/object-specific parameters (i.e. quality/status).

Environmental parameter data may include various environmental measurements such as air humidity, ambient light, direct light, temperature, etc.

Client parameter data may include a client identifier. The client may be a customer of the cloud server 902 provider, site operator such as a nursery. Client parameter data may include client input/output such as an article/object count, product delivered, processes/tasks completed, etc. Client parameter data may include a relative efficiency. The relative efficiency may be a comparison between the client efficiency metric and other customer efficiency metrics or between the client efficiency metric and an industry efficiency target. Client parameter data may include business parameters such as orders, sales, and contracts.

The cloud server 902 analyzes the retrieved data by running it through a program to produce an output. The output may be a prediction or a decision. The program may use artificial intelligence algorithms, such as machine learning and statistical models, to reach an output such as a prediction or decision.

In an embodiment, the cloud server 902 receives task data including a task/process identifier and a process outcome (e.g. task complete) and associates the task data with a device identifier and a client or task beneficiary identifier. In doing so, the cloud server 902 allows the system 900 to track an amount of work each device has done (e.g. tasks performed and nature of tasks), and for which task beneficiary. The cloud server 902 uses this data to produce billing information. This facilitates the implementation of the MaaS business model.

The cloud server 902 may be configured to run algorithms and data analytics to generate representations of aggregated data, such as dashboards or reports presenting the aggregated data in a human-readable form. The representations may be presented to clients (task beneficiaries), service providers, and/or third parties.

The cloud server 902 may be configured to run data through a neural network (via machine learning and deep learning algorithms) to identify trends or patterns to derive optimizations and insights. Insights may include market trends.

The cloud server 902 presents the analyzed data to different parties.

The cloud server 902 presents billing information to clients. The cloud server 902 presents operational statistics to service provider (owner of cloud server, robots etc.) for the optimized operation management of the devices. The cloud server 902 presents operational statistics to service provider for aftersales services (e.g. device health monitoring and predictive maintenance for devices). The cloud server 902 may present insights to the service provider for further optimization of device operation, or of the entire system (provide data to clients as well in this case). The cloud server 902 may present data requested (and permitted) to third parties.

The cloud server 902 may use the aggregated data to generate and provide billing information, support aftersales services (e.g. device health monitoring, predictive maintenance) for a device supplier, and provide a decision support system by big data analysis and insight generations.

Figure 9B:
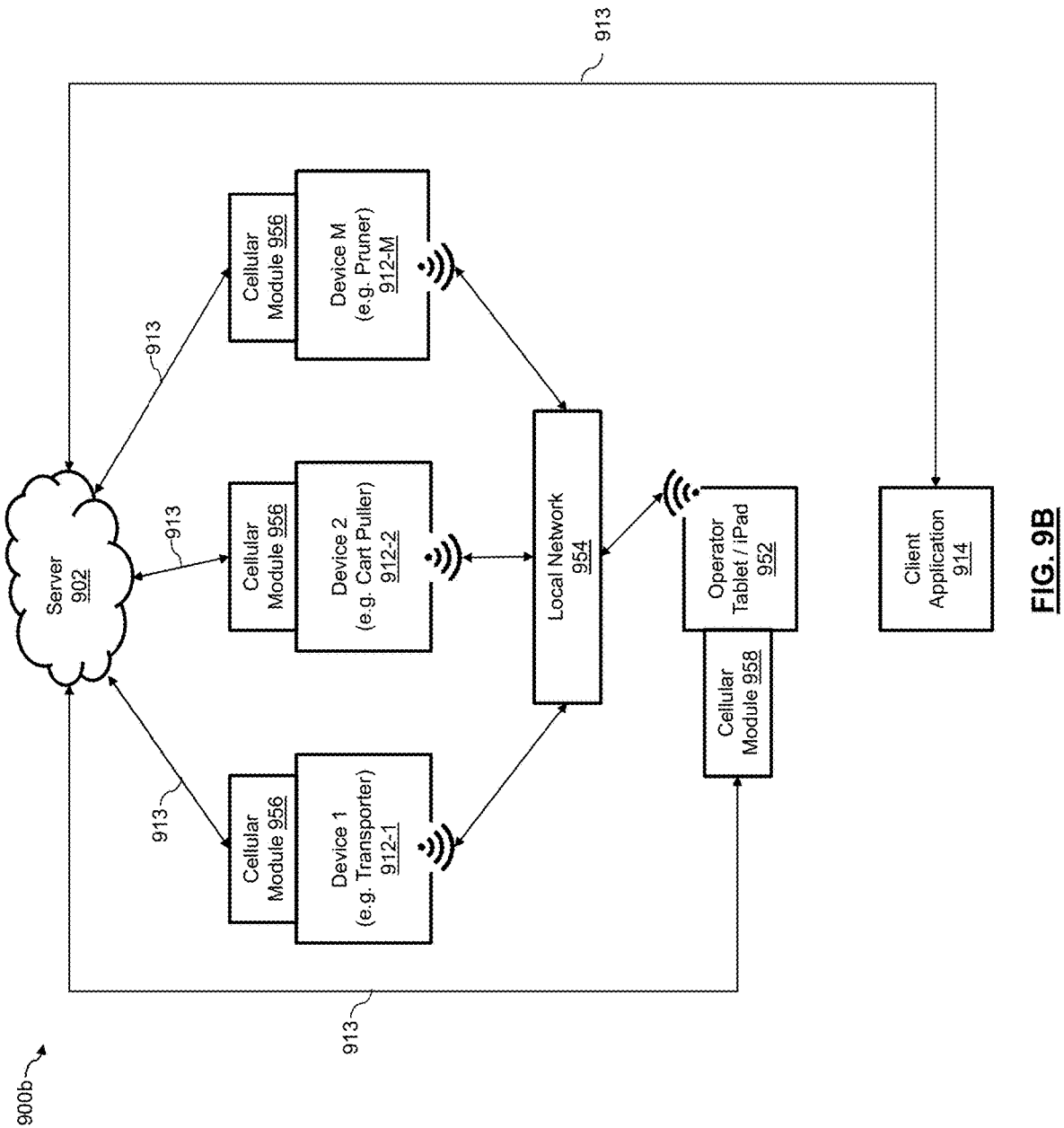
FIG. 9B is block diagram illustrating additional details of various gateway, device, and cloud components of the system of FIG. 9A, according to an embodiment.

Additional details of the system 900 are illustrated in FIG. 9B, according to an embodiment 900b. In particular, additional details of the gateway 913 and connections between devices 912, operators and the cloud server 902 are shown.

The cloud gateway 913 is a channel connecting devices 912, operators and client applications 914 to the cloud server 902. The gateway 913 may be at least one internet-enabled modem that bridges the connection of all devices at a site 910 to the cloud server 902 through a network such as the Internet.

The system 900b includes one or more operator tablets 952. Each operator may have an operator tablet 952 (e.g. iPad). The tablet 952 creates a local network hotspot which facilitates connection of multiple devices 912-1 to 912-M, using a network module such as WiFi module, to a local network 954, thereby allowing the operator to communicate with one or more of the devices 912 through a tablet application on the operator tablet 952.

Each device 912 includes a cellular enabled module 956, such as a module enabled with Huawei sim card. The cellular module 956 accommodates connection of each device 912 to the cloud server 902. In this case each device 912 is directly connected to the cloud 902. Having cellular modules 956 for each device 912 adds a layer of complexity and expense to the system 900b, but can ensure real-time connection of the devices 912 to the cloud server 902 in a larger operation range without the need for a central router or gateway device that may go outside of the effective range of the local network coverage (since effective coverage radius of cellular networks is much larger than the common local network technologies such as WiFi).

In another embodiment, the devices 912 may not include the cellular module 956 and may be connected to the cloud server 902 through a cloud gateway. The cloud gateway may be a router that connects to devices 912 through WiFi and connects to the cloud server 902 through the Internet, for example.

In some embodiments, the router may be the operator tablet 952 which is connected to devices 912 through the local network 954 and at the same time is connected to the cloud server 902 through the Internet using a cellular module 958 on the tablet 952.

Figure 10:
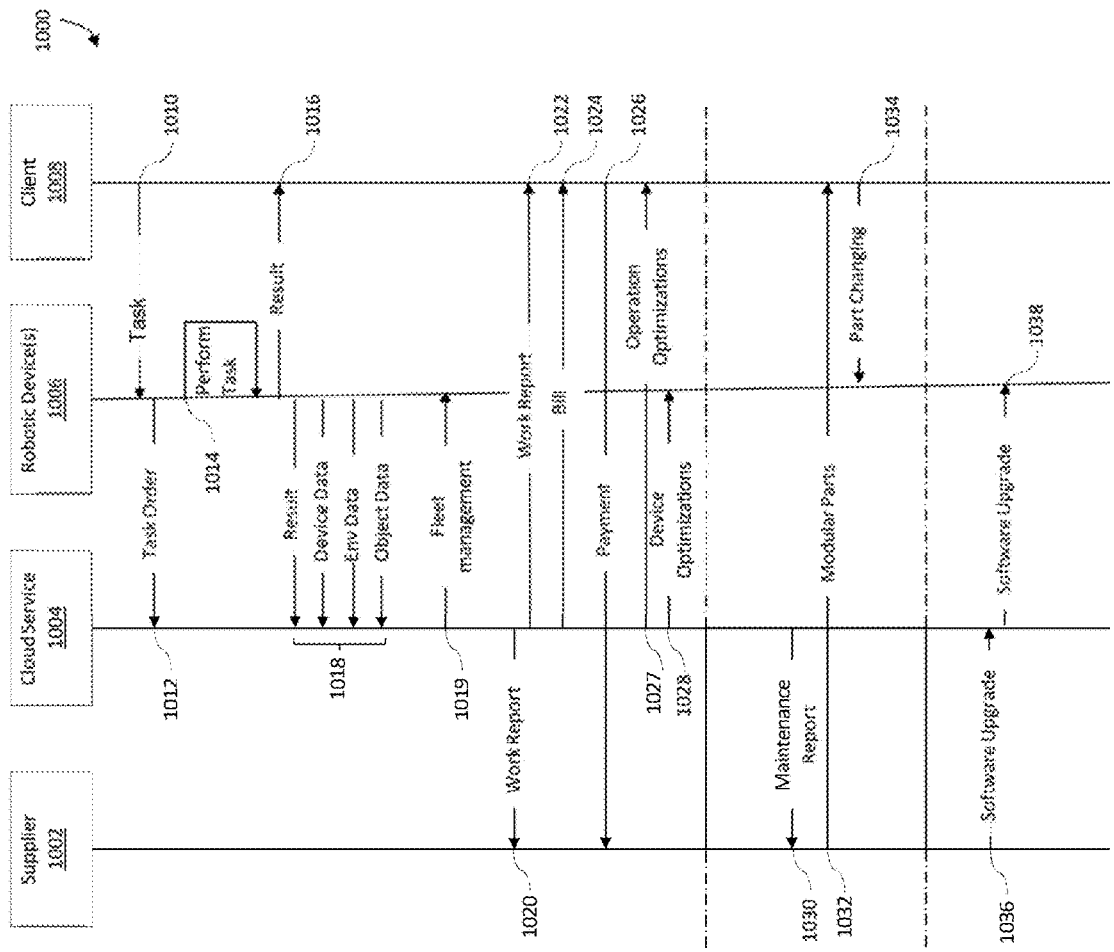
FIG. 10 is a schematic view of an information and process flow of the device management server of FIG. 9, according to an embodiment.

Referring now to FIG. 10, shown therein is a flow diagram of a method 600 of managing and tracking usage of a recruitable robotic device, according to an embodiment. The method 1000 may be implemented by the system 10 of FIG. 1.

Method 1000 shows data flow between a device supplier device 1002, a cloud device management server 1004, a robotic device 1006, and a task requestor/task beneficiary device 1008. The device supplier device 1002, robotic device 1006, and task beneficiary device 1008 are communicatively connected to the device management server 1004 via a network. The devices 1002, 1004, 1006, 1008 may correspond to devices 512, 516, 518, 522 of FIG. 5, respectively.

The device supplier device 1002 is associated with a device supplier. The device supplier supplies the robotic device 1006 to the task beneficiary. The device supplier may be a robotic device manufacturer or robotic device distributor.

The robotic device 1006 may be a robotic article transporting device. The robotic device 1006 may be a plant transporting device. The robotic device 1006 includes a task performance data subsystem. The task performance data subsystem includes sensors and other components for collecting and logging data during the performance of the task (i.e. task performance data)

The task beneficiary device 1008 is associated with a task beneficiary. The task beneficiary may also be a task requestor. The task beneficiary is the entity that wants the robotic device 1006 to perform the task for its benefit. The task beneficiary may be a site operator that has a plurality of robotic devices 1006 on site for performing automated tasks, such as transporting articles. The site may be a storage facility such as a warehouse, or any facility where article transportation is used such as a nursery (plant transportation) or airport (e.g. luggage transportation). The task beneficiary may employ or recruit the robotic devices 1006 to perform the tasks.

At 1010, the task beneficiary device issues a task order to the robotic device 1006.

At 1012, the robotic device 1006 reports to the cloud server 1004 that the robotic device 1006 has received the task order. To do so, the robotic device 1006 may transmit a task order receipt notification to the cloud server 1004. The receipt notification may be a report including task beneficiary data such as a task beneficiary identifier associated with the task beneficiary issuing the task order to the robotic device 1006. The receipt notification may include task parameter data. The task parameter data includes data about the task to be performed, such as a device identifier, a task beneficiary identifier, an article identifier, and task instructions.

In some cases, the task order issued at 1010 may be issued from the cloud server 1004. For example, the cloud server 1004 may receive a task request from the task beneficiary device 1008 and issue the task order to robotic device 1006 itself. The cloud server 1004 may receive the task order, analyze the status of robotic devices 1006, determine available robotic devices 1006, and assign the task to an available robotic device 1006. Assigning the task may include the cloud server 1004 sending the task instructions to the assigned device, for example using the device identifier. In such cases, the task parameter data included in the task notification may already be known and available to the cloud server 1004.

At 1014, the robotic device 1006 performs a task according to the task order. The robotic device 1006 logs task performance data during performance of the task using the task performance data subsystem. The robotic device 1006 may use sensors to log the task performance data. The task performance data may effectively log the process of carrying out the task and the task result or outcome. The task performance data includes a task outcome, such as a message or data indicating the task is completed.

Task performance data may be transmitted to the cloud server 1004 during the performance of the task (e.g. as data is collected, at regular intervals, etc.) or at the end of the task.

At 1016, the robotic device 1006 reports the task performance data or results to the task beneficiary, such as by transmitting the task performance data to the task beneficiary device 1008. The task performance data may include a task completion notification indicating the completion of the task to the task beneficiary.

At 1018, the robotic device 1006 transmits task performance data to the cloud server 1004. The task performance data transmitted may include task results, device data, environmental data, and transported article data.

At 1020, the cloud server 1004 processes the received data (including task performance data and task parameter data) and generates a supplier work report (i.e. a completed work profile). The completed work profile may summarize the received data. The cloud server 1004 transmits the supplier work report to the device supplier device 1002.

At 1022, the cloud server 1004 generates a beneficiary work report (i.e. completed work profile) and transmits the work report to the task beneficiary device 1008. The beneficiary work report is generated from the received data.

The supplier work report and beneficiary work report generated at 1020 and 1022, respectively, may include the same or different content. For example, in an embodiment, the cloud server 1004 may generate a type of universal work report (e.g. completed work profile 764) for all recipients (e.g. supplier, beneficiary) and transmit same to the recipients. In some cases, the recipient may be able to interact with the work report at the recipient device, which may cause certain work report data to be displayed and not others. For example, work report data may be displayed that is more relevant to the recipient. In another embodiment, the cloud server 1004 may generate a universal or master work report or completed work profile and then transmit or otherwise present only a subset of the work report data to the recipient at the recipient device depending on the role of the recipient and what data is desired and/or relevant. In yet another embodiment, the cloud server may generate separate supplier and beneficiary work reports including different work report data. In such a case, the cloud server 1004 may be configured to process a first subset of the received task data to generate the supplier work report and a second subset of the received task data to generate the beneficiary work report.

Generating the work reports at 1020 and 1022 may include the cloud server 1004 determining an amount of work performed by the robotic device 1006.

At 1024, the cloud server 1004 generates a bill for the work performed by the robotic device 1006 and transmits the bill to the task beneficiary device 1008. The bill includes a billable amount reflecting a cost for the work actually performed by the robotic device 1004. The cloud server 1004 may generate the billable amount by retrieving billing rate data and determining the billable amount using the work report data and the billing rate data. The billing rate may be predefined. The billing rate data may be stored in storage located at the cloud server 1004 or in a database or other storage otherwise accessible to the cloud server 1004 via a network connection (e.g. network 520 of FIG. 5).

Billing functions performed by the cloud server 1004 such as at 1024 enable the task beneficiary to pay the device supplier for the work done by the robotic device 1006 as determined by the cloud server 1004. In this manner, the cloud service 1004 facilitates a MaaS model, by acting as a central piece in monitoring, recording, and facilitating reliable billing for work performed by the robotic device 1006.

At 1028, the cloud server 1004 transmits a performance optimization to the robotic device 1006. The performance optimization may be a task performance optimization or a device performance optimization. The performance optimization may be generated at any point after receiving the task performance data at 1018. The performance optimization may include a suggested modification to how the robotic device 1006 performs a task (e.g. the task performed at 1014).

At 1019, the cloud server 1004 can perform or facilitate fleet management. The fleet management may include facilitating, controlling, or managing collaboration and cooperation among multiple robotic devices 1006 in communication with the cloud server 1004. For example, robotic devices 1006 may include a first robotic device and a second robotic device configured to collectively perform a master task. The master task may include a first subtask assigned to the first robotic device and a second subtask assigned to the second robotic device. The cloud server 1004 may determine and assign the subtasks. The cloud server 1004 may be configured to receive a signal from the first robotic device indicating completion of the first subtask, and, upon receiving the task completion signal, instruct the second robotic device to perform the second subtask.

The cloud server 1004 may also be configured to perform additional functions or provide additional services (e.g. after sales services).

At 1030, the cloud server 1004 generates a maintenance report from the data received at 1018. The maintenance report may include machine health data indicating a machine health state for the robotic device 1006. In some cases, machine health data may be received from the robotic device 1006 at 1018 and processed into a human-readable form presented in the maintenance report. In other cases, the cloud server may analyze the received machine health data, for example using a machine learning or statistical model, and generate derivate machine health data that provides further insight into the health or condition of the robotic device 1006. In some cases, the cloud server 1004 may analyze the machine health state and determine that a new part or component is required and may indicate such requirement or otherwise suggest action to the device supplier in the maintenance report.

At 1032, the device supplier may, based on the maintenance report, determine that a modular part or parts should be sent to the task beneficiary. The device supplier device 1002 may send the task beneficiary device (directly or via the cloud server 1004) maintenance instructions or notification that accompany the sent parts.

At 1034, the received maintenance instructions or notification may be used by the task beneficiary (or a technician acting for the task beneficiary) to conduct maintenance on the robotic device using the modular parts sent at 1032 (e.g. by changing the modular parts).

At 1036, the device supplier device 1002 may distribute a software upgrade for the robotic device 1006, for example via the cloud server 1004. This may include transmitting the software upgrade to the cloud server 1004.

At 1038, the cloud server 1004, having received the software upgrade from the device supplier device 1002, distributes and installs the software upgrade at the robotic device 1006.

Figure 11:
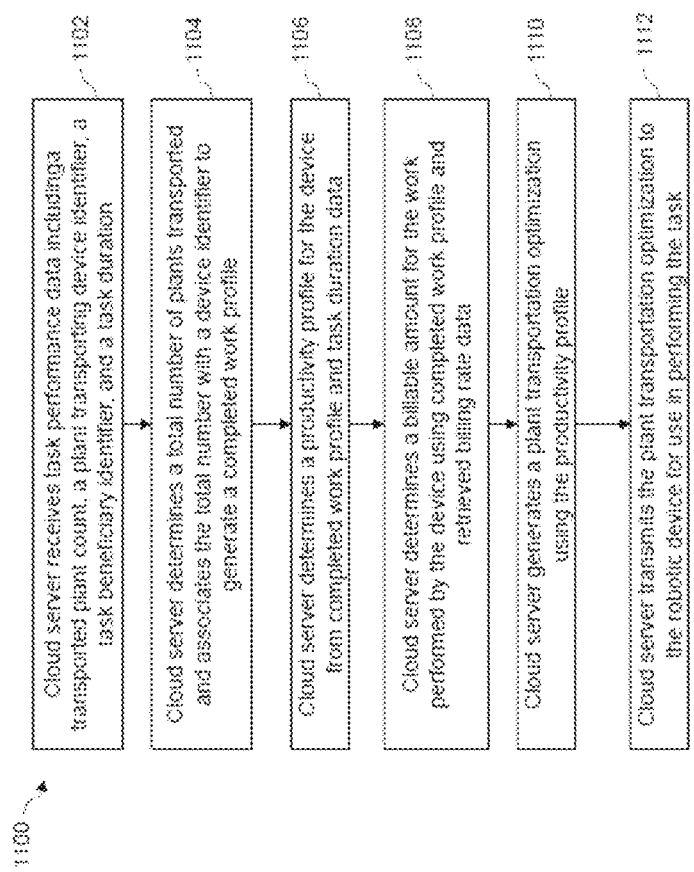
FIG. 11 is a flowchart of a method of operation of the device management server of FIG. 9 in an automated plant transportation application, according to an embodiment.

Referring now to FIG. 11, shown therein is a flowchart of a method 1100 of operation of device management server 902 in an automated plant transportation application, according to an embodiment. The automated plant transportation may be a chain of pot transportation.

The method 1100 may be implemented by an embodiment of system 510 wherein the robotic device 518 is a plant transporting robotic device.

The plant transporting device is configured to receive plant transportation task instructions and automatically perform a plant transportation task according to the instructions.

The task instructions may be received from the device management server or the task beneficiary device.

The plant transportation task may include, for example, transporting a plant between a potting station and a growing field, transporting the plant from a first location to a second location within the growing field, or transporting the plant from the growing field to a shipping station.

At 1102, the cloud server 902 receives task performance data from the robotic plant transporting device including a transported article count (i.e. a total number of pots transported in a growing field), a plant transporting device identifier, a task beneficiary identifier (i.e. the entity for which the pots are being moved for), and a task duration (i.e. time spent or elapsed by the plant transporting device transporting pots).

In some cases, the transported article count may be determined by the robotic device and transmitted to the cloud server. For example, the robotic device may be configured to maintain a transported article count from a record or log of completed tasks. In other cases, the cloud server may receive notification of tasks completed by the device and determine the transported article count from the received task completion notifications.

At 1104, the cloud server 902 analyzes the task performance data and determines an amount of work done by the robotic plant transporting device. The amount of work may represent a total number of plants moved by the device. The cloud server associates the number of pots moved with the device identifier to determine the work total for the device.

At 1106, the cloud server 902 further analyzes the task performance data and determines a device productivity level/profile for the robotic plant transporting device. The cloud server 902 associates the work total/completed work profile (as determined at 1104) with task duration data to determine the device productivity level.

At 1108, the cloud server generates a billing profile including a billable amount for the work performed by the robotic plant transporting device. The cloud server stores billing rate data for determining the billable amount. The cloud server 902 associates the completed work profile, including the work performed by the device, with a task beneficiary identifier. The cloud server 902 also determines the billable amount from the completed work profile and the billing rate data. Using the billing profile, the cloud server 902 can send a bill to the task beneficiary for the amount of work performed by the robotic plant transporting device.

At 1110, the cloud server generates a pot/plant transportation optimization. The plant transportation optimization may be, for example, a suggested modification to a navigation route used by the robotic device to perform the same or similar plant transportation task. The cloud server may determine the plant transportation optimization by feeding data from the productivity profile as an input to a machine learning algorithm configured to generate the plant transportation optimization as an output. In a particular embodiment, the cloud server 902 may include a neural network configured to receive the productivity profile data at an input layer and generate the plant transportation optimization at an output layer.

At 1112, the plant transportation optimization can be transmitted to the robotic device. The robotic device can perform the plant transportation task using the received optimization.

Figure 12:
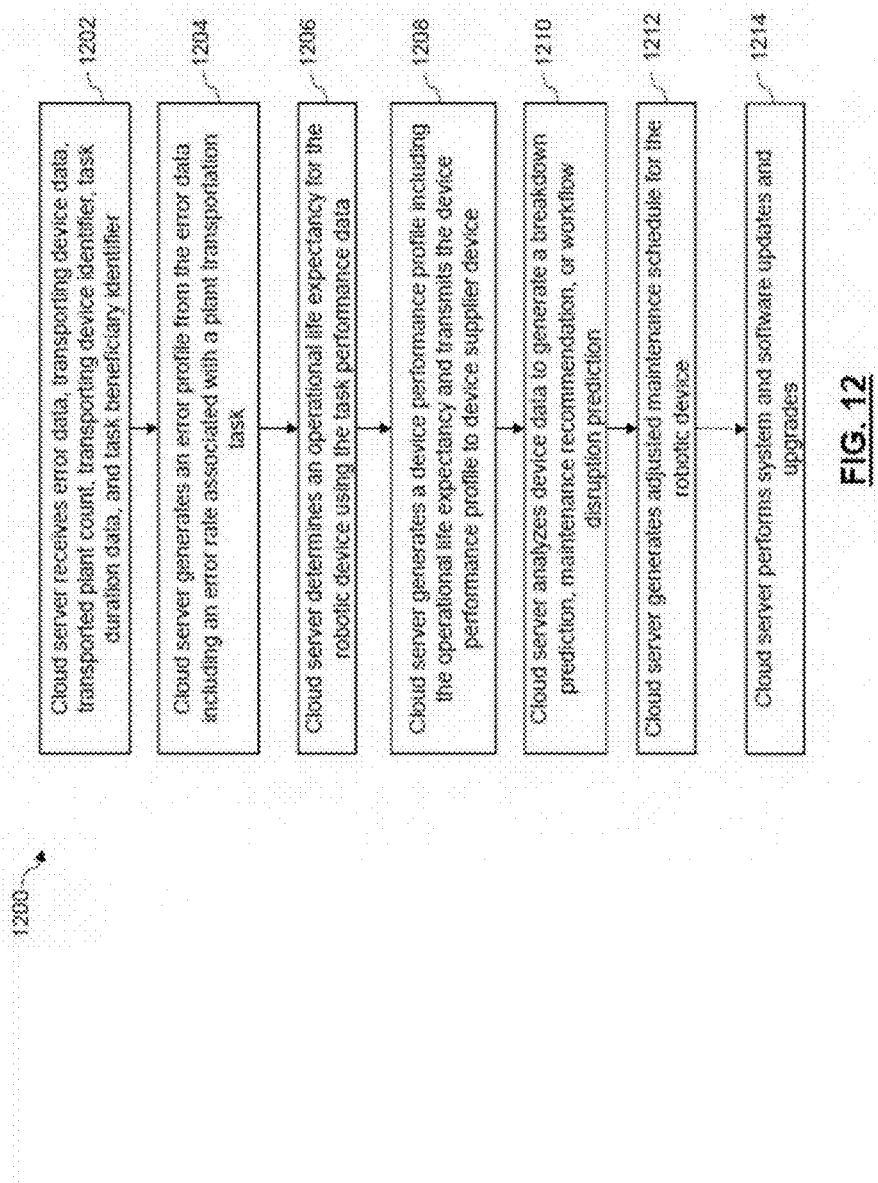
FIG. 12 is a flowchart of a method of operation of the device management server of FIG. 9 in an automated plant transportation application, according to an embodiment.

Referring now to FIG. 12, shown therein is a flowchart of a method 1200 of operation of the device management server 902 in an automated plant transportation application, according to an embodiment. The device management server 902 may implement method 1200 along with method 1100 of FIG. 11. Method 1200 may be used by the cloud server 902 to facilitate after sales service for a system of chain of pot transportation.

At 1202, the cloud server receives task performance data from the robotic plant transporting device including error data, transporting device data, a transported plant count, a transporting device identifier, task duration data, and a task beneficiary identifier.

The error data includes errors made by the robotic plant transporting device during performance of the plant transportation task. The robotic plant transporting device is configured to recognize and log such errors as error data and transmit the error data to the cloud server either during performance of the task or at or after completion of the task. Error data may include an error type, error description, associated task, and associated device-specific parameter for each error.

The device data includes device parameter data. The device parameter data includes device-specific parameters such as power used by the robotic device during performance of the task and actuations performed by a particular component (e.g. a manipulator arm of the robotic device).

The device data also includes machine health data. The machine health data includes a number of performance cycles of the device or a device component before failure. The robotic device includes a machine health subsystem including sensors and the like for collecting and logging device performance data such as performance cycles and failure events. The robotic device transmits the machine health data (including the performance cycles and failure events) to the cloud server during performance of the task (e.g. at time of failure) or at or after completion of the task.

The transported article count includes a total number of pots transported in a location (e.g. a growing field).

At 1204, the cloud server analyzes the task performance data, including the error data, and generates an error profile for the robotic device. The error profile includes an error rate determined by the cloud server from error data. The error rate may be associated with a particular task and a particular device-specific parameter. For example, the error rate may be associated with a plant transportation task (task) and may result from manipulator arm movements (device-specific parameter). The cloud server may determine error rates for a plurality of tasks and/or a plurality of device specific parameters.

At 1206, the cloud server analyzes task performance data including device data and determines an operational life expectancy. The operational life expectancy may be for the robotic device itself, or for a component thereof (such as a manipulator arm).

At 1208, the cloud server generates a device performance profile. The device performance profile may include the operational life expectancy. The device performance profile includes performance characteristics and notifications related thereto. The performance characteristics may include points of failure. The performance profile is sent to the device supplier device. The performance profile may provide the device supplier with valuable information to facilitate further developments to the robotic device and design-level changes or modifications.

At 1210, the cloud server analyzes the device data to generate any one or more of a breakdown prediction (for the device or component thereof), a maintenance recommendation (e.g. a suggested maintenance action and timeline for performing such maintenance action), and a potential workflow disruption (caused by the device performance).

At 1212, the cloud server generates an adjusted maintenance schedule for the robotic device. The input for the adjusted maintenance determination may include a current routine maintenance schedule or interval and an operation life expectancy (such as determined by the cloud server at 1206). The adjusted maintenance schedule may be transmitted to the device supplier device or the task beneficiary device.

At 1214, the cloud server performs over the air reactive system and software upgrades and updates. The actions can be performed remotely by the cloud server via the network. The cloud server may provide the updates and upgrades to restore, alter, or improve software or hardware functionality for the robotic device. The cloud server receives the updates and upgrades from the device supplier device.

Figure 13:
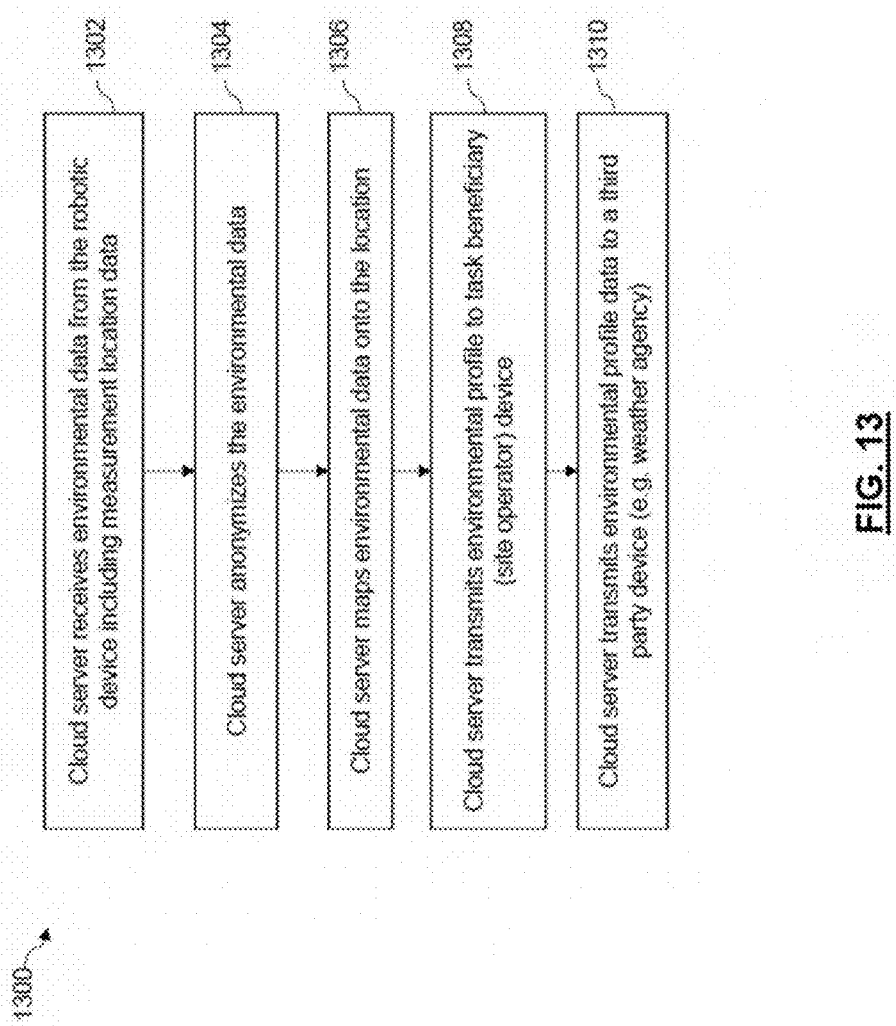
FIG. 13 is a flowchart of a method of operation of the device management server of FIG. 9, according to an embodiment.

Referring now to FIG. 13, shown therein is a flowchart of a method 1300 of operation of device management server 902, according to an embodiment. A device management server configured to implement method 1300 can perform an environment management and tracking function for a site operator (task beneficiary). The method 1300 may be particularly advantageous in the context of transporting articles that are particularly sensitive to environmental variation, such as plants, in site environments where environmental condition regulation is critical.

At 1302, the cloud server 902 receives environmental data from the robotic device. The robotic device collects the environmental data during the performance of a task and transmits the environmental data to the cloud server during the task or at or after completion of the task. The robotic device includes an environmental data collection subsystem, which may include a plurality of sensors configured to measure specific environmental parameters.

The environmental data includes air humidity data, ambient light data, direct light data, nursery temperature data, and atmospheric composition data (e.g. O2 levels, CO2 levels). In other embodiments, the environmental data may include other environmental parameters (e.g. pressure, etc.) that are relevant to the particular site from which the measurements are being taken.

The environmental data includes measurement location data. For example, the environmental data collection subsystem may be configured to determine an include a location for each measurement taken by the subsystem. The location data may be provided by a GPS or similar device onboard the robotic device.

The cloud server may generate an environmental profile for the site using the environmental data, the measurement location data, and site location data (e.g. geographic location of the nursery).

At 1304, the cloud server anonymizes or otherwise removes sensitive task beneficiary data from the received data.

At 1306, the cloud server maps the environmental data [parameters] onto the location using the environmental data and location data.

At 1308, the cloud server transmits the environmental profile (analyzed data) to the task beneficiary device (site operator device). The profile can be displayed at the site operator device and used for environmental management of the site. In an example, the environmental profile is of a greenhouse, and the environmental profile is provided to the greenhouse operator via the task beneficiary device and can be used by the greenhouse operator to manage the greenhouse environmental conditions.

At 1310, the environmental data may be transmitted or otherwise made available to a third party device, the third party device associated with a third party such as a weather agency. The environmental data may be used as climate data by the third party for the geographic location of the nursery.

Figure 14:
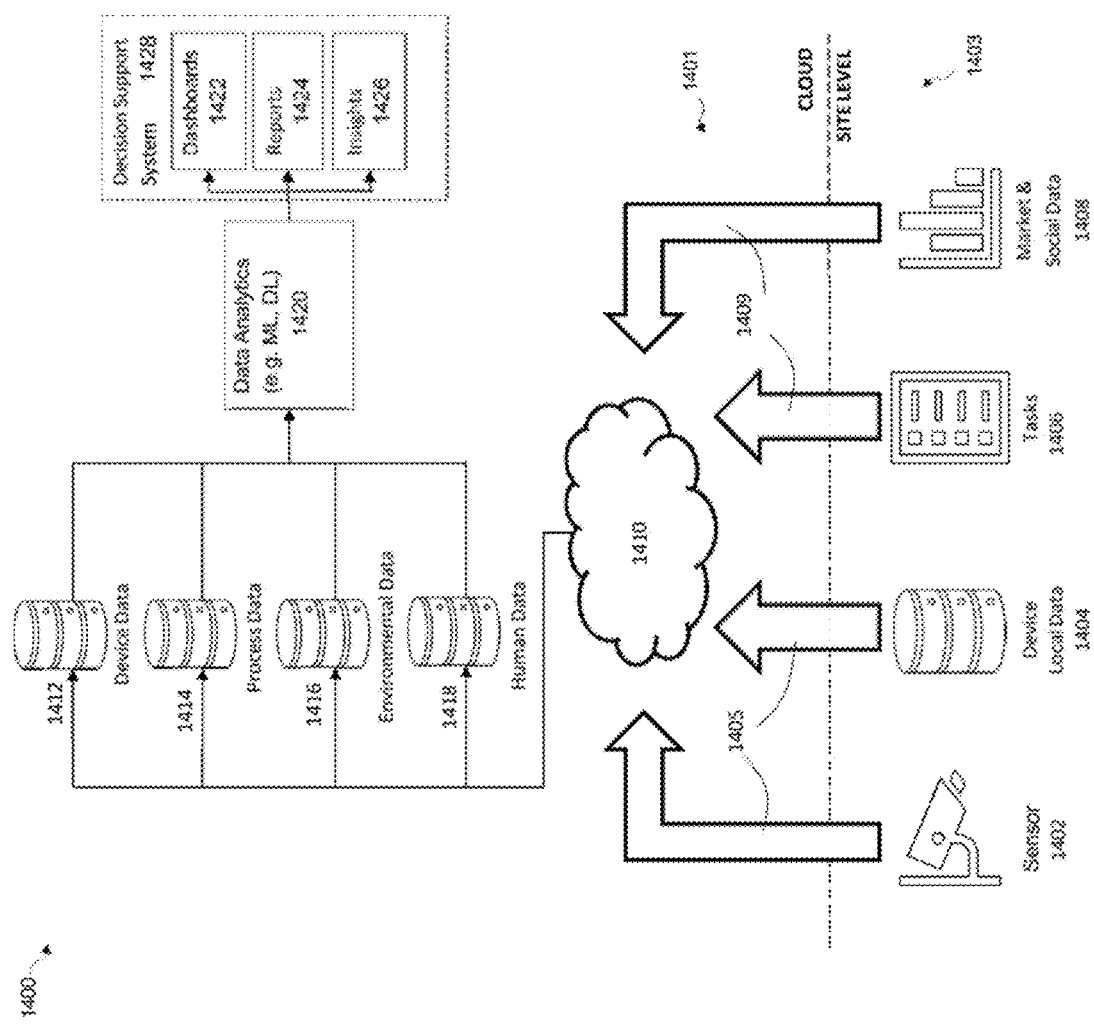
FIG. 14 is a schematic view of data handling, including data gathering, storage, processing, in the device management server of FIG. 9, according to an embodiment.

Referring now to FIG. 14, shown therein is a system 1400 of data gathering and processing by the cloud server of FIG. 9, according to an embodiment.

The system 1400 includes components located in a cloud environment 1401 and components located at a site level 1403. Various components at site level 1403 are communicatively connected to components in the cloud 1401 via a network.

The cloud 1401 includes a device management server 1410. The device management server 1410, located in the cloud 1401, is implemented as a cloud server.

The site level 1403 represents a site at which robotic tasks managed and tracked by the system 1400, and in particular the device management server 1410, are performed. The site level 1403 may be a plant storage facility such as a nursery or greenhouse, or other site or facility at which articles are stored and/or transported such as a warehouse, farm, or airport. The site level 1403 may be indoors, outdoors, or both indoors and outdoors. The type of site represented by the site level 1403 is not limiting.

The site level 1403 includes a plurality of data sources. The data sources are communicatively connected to the device management server 1410 via the network. The device management server 1410 is configured to gather and store data from the data sources. The device management server 1410 may analyze or otherwise process the data gathered from the data sources to generate an output.

The data sources include sensors 1402, device local data 1404, tasks 1406, and market and social data 1408.

The sensors 1402 may include mobile sensors on mobile robotic devices working at the site 1403, static sensors installed at the site 1403, or machinery sensors which are integral to existing machinery but may be connected to the cloud server 1410 through an IoT box, for example.

The sensors 1402 are configured to collect and transmit a variety of sensor data. The sensor data may include environmental data including time, temperature, air pressure, relative humidity, ambient/direct levels of sunlight/artificial light, atmospheric composition, and geographic location, or any other data that can be measured through sensors interacting with the environment.

The device local data 1404 includes data stored transiently or permanently on any physical or virtual memory of any device located at the site 1403 that is communicatively connected to the cloud server 1410. In an example, the device local data 1404 is data stored on memory of a robotic device configured to perform tasks at the site 1403, such as robotic device 1006 if FIG. 6. In a plant transportation embodiment, the robotic device may be a cart pulling robot or plant transporting robot (such as cart pulling robot 20 and plant transporting robot 34 of FIG. 1), for example.

The local device data 1404 may include data such as operational logs, stored sensor data, error logs, maintenance logs, and operational parameters. The operational logs may be generated by specific devices during operation at the site 1403. The stored sensor data may include any of the sensor data types collected by sensors 1402, such as those described above. The operational parameters may include operational parameters for the device set by a device operator.

The tasks 1406 may include lists of tasks assigned to one or more robotic devices. The tasks 1406 may be assigned by an operator. The tasks 1406 may be assigned automatically by the device management server 1410, or by a local device (e.g. a device at site 1403).

Each task 1406 may include associated task data. Task data may include task parameter data and task performance data. Task parameter data includes data known about the task prior to performance of the task, such as details about the nature of the task. Task parameter data may include data, such as task instructions and a device assignment, that is sufficient to enable performance of the task by the assigned device. Task performance data includes data generated after commencement and via performance of the task. In some cases, task performance data may include task parameter data. The task parameter data may help classify or organize task performance data as related to a certain task.

The task data for a task 1406 may include a device identifier for the device performing the task, an operator identifier, a task duration, and a task result or outcome.

The market and social data 1408 may include sales data and other client-related data. Sales data may include order data and delivery data. Other client-related data may include web site visits, ratings data, or any other human-sourced information.

The market and social data 1408 may be received by the device management server 1410 from an operator device.

The market and social data 1408 may be made available to the server 1410 by the operator voluntarily and upon manual action by the operator.

The data sources are communicatively connected to the device management server 1410. The sensors 1402 and device local data 1404 may communicate with the server 1410 via an IoT platform 1405. The tasks 1406 and market and social data 1408 may be communicated to the server 1410 via a web interface 1409, for example.

Once the server 1410 receives data from the data source 1402, 1404, 1406, 1408, the server 1410 may re-categorize the data and store it on cloud storage. For example, certain aspects of the local device data 1404, sensor data 1402, and task data 1406 may be data associated with a device (e.g. a device performing a task) and be stored on the server 1410 as device data 1412. Other sensor data 1402 may be stored on the server 1410 as environmental data 1416, for example. This may be the case when the sensor data 1402 relates to the environment of the site 1403.

As another example, the server 1410 may reclassify task data 1406 as device data 1412, process data 1414, or human data 1418.

The server 1410 may reclassify task data 1406 as device data 1412 if the task data 1406 pertains to a specific device being issued a task.

The server 1410 may reclassify task data 1406 as process data 1414 for the task details, what the task involves, or the task outcome.

The server 1410 may reclassify task data 1406 as human data 1418 for information regarding a task requestor identifier (who requested the task) and the task size when combined with market and social data 1408, for example.

The device management server 1410 includes a data analytics engine 720. The server 1410 provides the reclassified data 1412, 1414, 1416, 1418 to the data analytics engine 1420. The data analytics engine 1420 may then process the reclassified data 1412, 1414, 1416, 1418 using data analytics techniques 1420 to generate an output. The data analytics techniques used by the data analytics engine 1420 may include the use and application of machine learning and deep learning algorithms and models.

The data analytics engine 1420 may be configured to generate an output falling into any one or more of three general output categories including dashboards 1422, reports 1424, and insights 1426.

The dashboards 1422 may present the analyzed data to suppliers, robotic device manufacturers, and task beneficiaries (clients). The dashboards 1422 may display or otherwise present a current state of the system to the aforementioned entities. The dashboards 1422 may be tailored to a specific entity, for example presenting analyzed data of particular relevance or concern to the specific entity.

The reports 1424 may be provided to one or more entities such as suppliers, robot manufacturers, and task beneficiaries. The reports 1424 may present aggregated and past states of the system. This may allow the visualization of trends or facilitation of billing for work performed by robotic devices, for example.

The insights 1426 may include predictions or potential optimizations. The optimizations may relate to the performance of tasks by devices, machine health and performance characteristics of robotic devices and components thereof, and the operation of the site 1403 and devices operating at the site 1403. The predictions and optimizations may be offered and used in implementing future states of the system.

and insights 1426 to, for example, offer predictions and potential optimizations for implementing future states of the system.

The outputs 1422, 1424, 1426 may be part of a decision support system 1428. The decision support system or components thereof may be presented or displayed at a device supplier device or task beneficiary device. The decision support system 1428 may include a plurality of modules for generating the outputs, such as a dashboard module, a report module, and an insight module. The decision support system 1428 may assist decision-making processes for device suppliers and task beneficiaries.

Figure 15A:
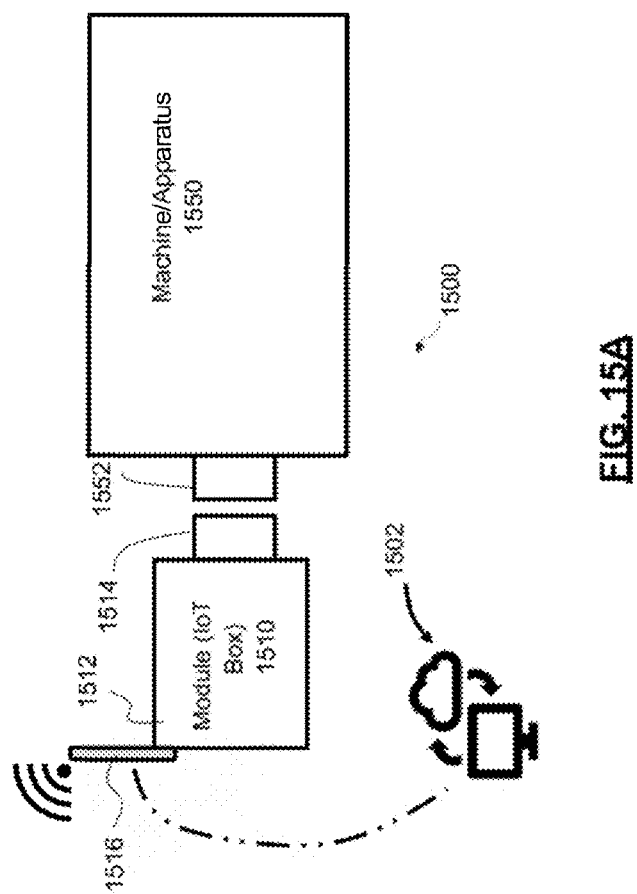
FIG. 15A is a schematic diagram of a robotic device including a network-enabled module, according to an embodiment.

Referring now to FIG. 15A, shown therein is a block diagram of a robotic device 1500, according to an embodiment. The robotic device 1500 is configured to receive task instructions and autonomously perform the task according to the task instructions. The robotic device 1500 may be a robotic article transporting device, such as the cart pulling robot 20 and plant transporting robot 34 of FIG. 1.

The robotic device 1500 includes a machine/apparatus 1550. The machine 1550 is configured to autonomously perform the task. The machine 1550 may include all the necessary components to autonomously perform the task according to the task instructions.

The robotic device 1500 includes a network-enabled module 1510. The network-enabled module 1510 may be integrated with the machine 1550 to facilitate communication of the robotic device 1500 with other aspects of a system, such as a device management server 1502 or task beneficiary device (not shown). The network-enabled module 1510 may be an IoT box.

The network-enabled module 1510 includes a housing 1512, a module electrical interface 1514 disposed on the housing 1512, and a network module 1516 disposed on the housing 1512. The module electrical interface 1514 is configured to receive an electrical signal from the machine 1550. The network module 1516 is configured to transmit signals directly or indirectly to the device management server 1502 (e.g. cloud server 1410 of FIG. 14). The network module 1516 may be a WiFi or GSM module.

The network-enabled module 1510 may be integrated into the machine 1550 by connecting the module electrical interface 1514 to a complementary machine electrical interface 1552 of the machine 1550.

The network-enabled module 1510 may receive electrical power from the machine 1550 through the module electrical interface 1514 or may have an on-board power supply.

The network-enabled module 1510 may also include a microprocessor. The microprocessor includes a controller and a memory to further process and store the received signals. The microprocessor may further include a set of application program interfaces (APIs) to facilitate the software interaction between the network-enabled module 1510 and device management server 1502 and between the network-enabled module 1510 and the machine 1550.

Figure 15B:
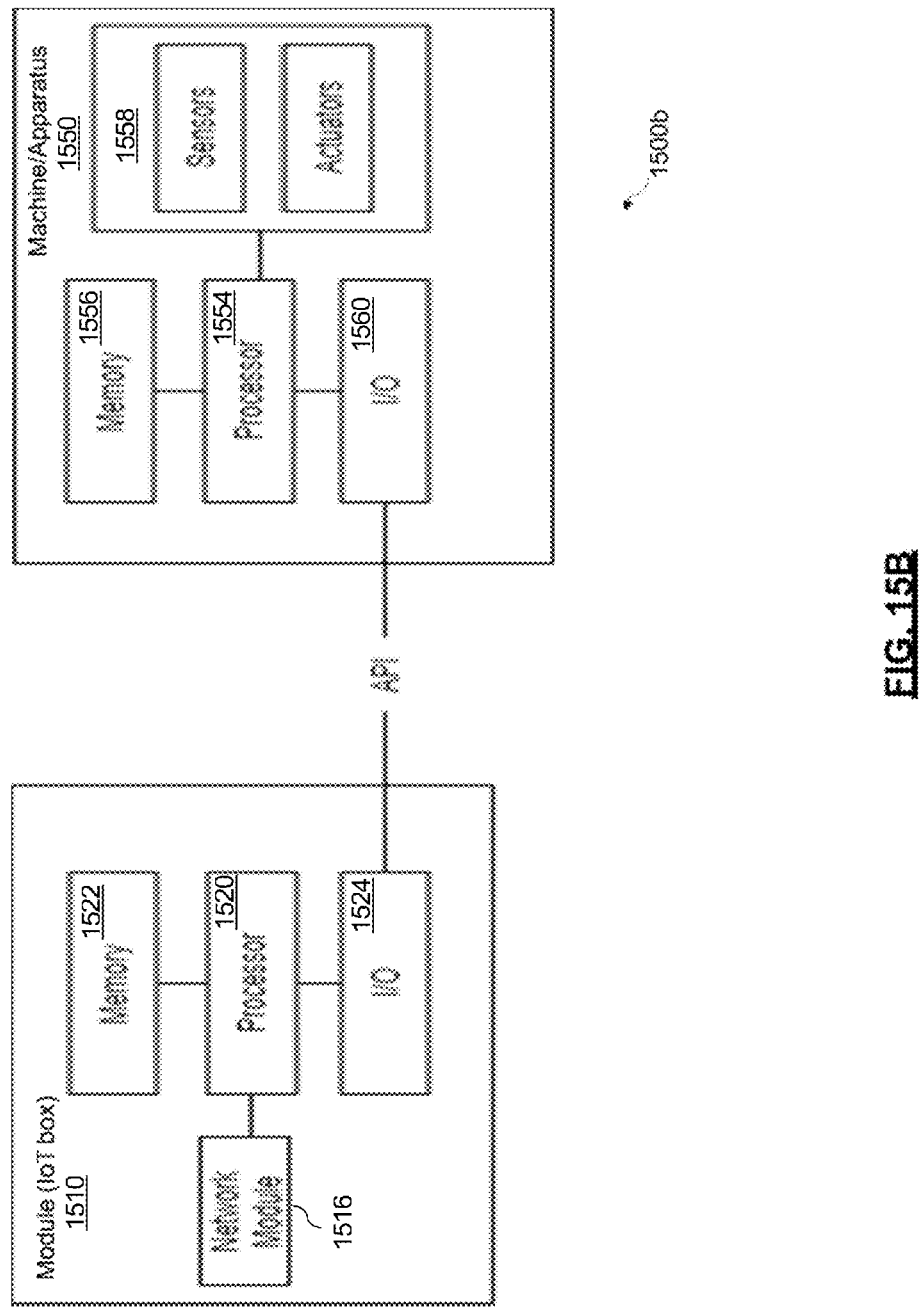
FIG. 15B is a block diagram of components of the robotic device of FIG. 15A, according to an embodiment.

Referring now to FIG. 15B, shown therein is a block diagram of a data flow architecture 1500b between the network-enabled module 1510 and machine 1550 of FIG. 15A, according to an embodiment.

The machine 1550 includes a processor 1554 which may include a memory 1556.

The machine 1550 also includes machine components 1558. The machine components 1558 may include sensors, actuators, and a power source. Data from the machine components 1558 flows to the processor 1554.

The processor 1554 is coupled to an input/output (I/O) port 1560. The I/O port 1560 is coupled to the complementary machine interface 1552 of the machine 1550.

The network-enabled module 1510 may include a memory 1522, the network module 1516, and an I/O port 1524 coupled to a processor 1520. The I/O port 1524 of the network-enabled module 1510 is coupled to the module electrical interface 1514.

The module processor 1520 may communicate data with the machine processor 1554 through a standardized software interface such as a common Application Programming Interface (API) 1560. The API 1560 may also be provided to or otherwise made known to third-party developers or providers of the machine 1550.

The machine 1550 may be a potting machine. The communicated data received from the machine 1550 may include number of repotted pots, the weight of soil used for potting or repotting, and images of plants after replanting.

The machine 1550 may be a robot's battery charging machine. The communicated data received from the machine may include number of times a robot's battery is recharged.

The machine 1550 may be a packaging and labeling machine. The communicated data received from the machine may include a number of certain plants packages and shipped.

Additionally, the network-enabled module 1510 may be configured to receive machine health signals for the machine 1550. The machine health signals may be received from the machine 1550 via the machine electrical interface 1552. The machine health signals relate to and may describe the health of the machine 1550. The machine health signals may include an operating temperature of the machine 1550, a current drawn by the machine 1550, and vibrations of the machine 1550. The network-enabled module 1510 may aggregate the received machine health signals and run them through a machine learning algorithm to learn a machine health signature (MHS). The MHS can be used by the network-enabled module 1510 to identify and predict faults and malfunctions of the machine 1550.

In another embodiment, the machine health signals or the MHS may be transmitted to the device management server 1502 for analysis. For example, the server 1502 may receive the machine health signals from the network-enabled module 1510 and provide them to a machine learning model or algorithm configured to output the MHS. The MHS may be analyzed by the server 1502 or provided to the network-enabled module 1510 where it can be used to identify and predict faults and malfunctions.

The network-enabled module 1510 may advantageously enable the connectivity of various workspace machines 1550 to the cloud server 1502 and monitoring the health of the machines 1550. The network-enabled module 1510 may also advantageously optimize flow and volume of data from the machine 1550 to the cloud server 1502 by locally processing and analyzing the received data using the microprocessor 1520 onboard the network-enabled module 1510.

While the above description provides examples of one or more apparatus, methods, or systems, it will be appreciated that other apparatus, methods, or systems may be within the scope of the claims as interpreted by one of skill in the art.

The invention claimed is:

1. A system for managing and tracking plant management at a site, the system comprising:
   a device management server for tracking an optimizing performance of plant management devices; and a plant management device communicatively connected to the device management server via a network, the plant management device including at least one device parameter for controlling an autonomous operation of the plant management device;

wherein the plant management device is configured to:
- receive a task order for defining a plant management task to be performed by the plant management device, the task order including a task identifier and a plant identifier for a plant being managed by the plant management task; and
- autonomously perform the plant management task according to the received task order;
- send a task receipt notification including a task beneficiary identifier to the device management server, the task receipt notification for reporting the task order to the device management server;
- log errors made by the plant management device during performance of the plant management task and store the logged errors as error data;
- transmit the error data to the device management server;

and wherein the device management server is configured to:
- generate a work report for the plant management device summarizing performance of the plant management task by the plant management device;
- generate a billing report including a billable amount for the plant management device using the task beneficiary identifier and billing rate data; and
- generate a productivity profile for the plant management device, the productivity profile for describing a productivity level of the plant management device;
- determine a device parameter optimization for optimizing the at least one device parameter of the plant management device using the received error data; and
- transmit the device parameter optimization to the plant management device as performance optimization data; and wherein the plant management device uses the performance optimization data to configure the at least one device parameter for the performance of a subsequent plant management task.

2. The system of claim 1, wherein the task order includes instructions for performing at least one of:
- transporting the plant between a potting station and a growing field;
- transporting the plant from a first location to a second location within the growing field; and
- transporting the plant from the growing field to a shipping station.

3. The system of claim 1, wherein the device management server is further configured to generate a navigation route optimization from the productivity profile.

4. The system of claim 3, wherein the device management server is further configured to provide the error data as an input to a machine learning algorithm, the machine learning algorithm configured to determine the device parameter optimization as an output.

5. The system of claim 1, wherein the plant management device is further configured to transmit environmental data about the site to the device management server, and wherein the device management server is further configured to determine whether the environmental data deviates from an accepted standard.

6. The system of claim 5, wherein the environmental data includes at least one of air humidity, ambient light, direct light, temperature, and atmospheric composition.

7. The system of claim 5, wherein the environmental data includes location data for each measurement.

8. The system of claim 1, wherein the device management server is further configured to determine an operational life expectancy for the plant management device, wherein the operational life expectancy includes an estimated number of performance cycles before failure.

9. The system of claim 1, wherein the device management server is further configured to determine the operational life expectancy from a machine health signature.

10. The system of claim 1, wherein the task performance data includes transported plant data, and wherein the device management server is further configured to determine a plant health condition from the transported plant data.

11. The system of claim 1, wherein the plant management device includes a processing module for autonomously performing a plant processing task on the plant.

12. The system of claim 1, wherein the error data includes any one or more of an error type, an error description, associated task, and associated device-specific parameter for each error.

13. The system of claim 1, wherein the device management server is further configured to generate a device performance profile for indicating performance characteristics of the plant management device using the error data.

* * * * *